(12) United States Patent
Sanbe

(10) Patent No.: US 6,753,890 B2
(45) Date of Patent: Jun. 22, 2004

(54) WINDOW DESIGN ALTERATION METHOD AND SYSTEM

(75) Inventor: Masanori Sanbe, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 538 days.

(21) Appl. No.: 09/793,588

(22) Filed: Feb. 27, 2001

(65) Prior Publication Data

US 2002/0054054 A1 May 9, 2002

(30) Foreign Application Priority Data

Feb. 28, 2000 (JP) .................................... 2000-051321

(51) Int. Cl.⁷ ............................................... G09G 5/00
(52) U.S. Cl. ...................... 345/788; 345/764; 345/765
(58) Field of Search ................. 345/762, 763, 345/764–769, 778, 779, 781–807, 825, 840, 835, 853

(56) References Cited

U.S. PATENT DOCUMENTS

| | | | | |
|---|---|---|---|---|
| 5,367,626 A | | 11/1994 | Morioka et al. ............ | 345/837 |
| 5,689,665 A | | 11/1997 | Mitsui et al. ............... | 345/764 |
| 5,721,848 A | | 2/1998 | Joseph ........................ | 345/803 |
| 5,796,401 A | * | 8/1998 | Winer ......................... | 345/619 |
| 5,812,847 A | * | 9/1998 | Joshi et al. .................. | 709/329 |
| 5,874,966 A | | 2/1999 | Polimeni et al. ............ | 345/854 |
| 5,895,476 A | * | 4/1999 | Orr et al. .................... | 715/517 |
| 5,959,624 A | | 9/1999 | Johnston, Jr. et al. ...... | 345/746 |
| 6,026,417 A | * | 2/2000 | Ross et al. .................. | 715/517 |
| 6,169,547 B1 | * | 1/2001 | Tanaka et al. .............. | 345/838 |
| 6,330,007 B1 | * | 12/2001 | Isreal et al. ................. | 345/762 |
| 6,337,698 B1 | * | 1/2002 | Keely et al. ................ | 345/823 |
| 6,462,759 B1 | * | 10/2002 | Kurtzberg et al. .......... | 345/803 |
| 6,473,102 B1 | * | 10/2002 | Rodden et al. ............. | 345/788 |

FOREIGN PATENT DOCUMENTS

| | | |
|---|---|---|
| EP | 0 558 224 | 9/1993 |
| WO | WO 97/49026 | 12/1997 |

OTHER PUBLICATIONS

IBM Technical Disclosure Bulletin, vol. 32, No. 6b, XP–000073795, pp. 219–223, "Operator Interface for the Creation and Control of Windows", Nov. 1, 1989.

* cited by examiner

Primary Examiner—John Cabeca
Assistant Examiner—Tadesse Hailu
(74) Attorney, Agent, or Firm—Oblon, Spivak, McClelland, Maier & Neustadt, P.C.

(57) ABSTRACT

In a window design alteration method, a design of a window which is specified as an object of a design alteration from among windows being displayed on a screen is automatically self-altered by a design self-alteration function of the specified window to the same design as a design of a bit map selected from among bit maps that have been stored in a memory, and the automatic self-alteration is carried out so that a function included in the specified window is effective within an outline pertaining to a design after the automatic self-alteration.

21 Claims, 15 Drawing Sheets

PLAY

STOP

PAUSE

FAST FORWARD

REWIND

FIG.19A PLAY
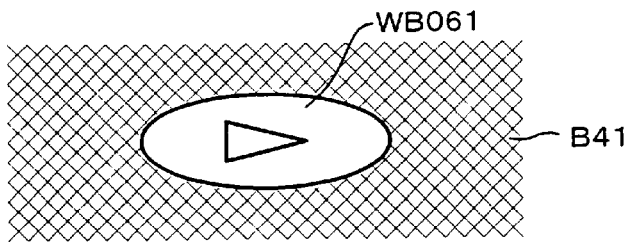
FIG.19B STOP
FIG.19C PAUSE
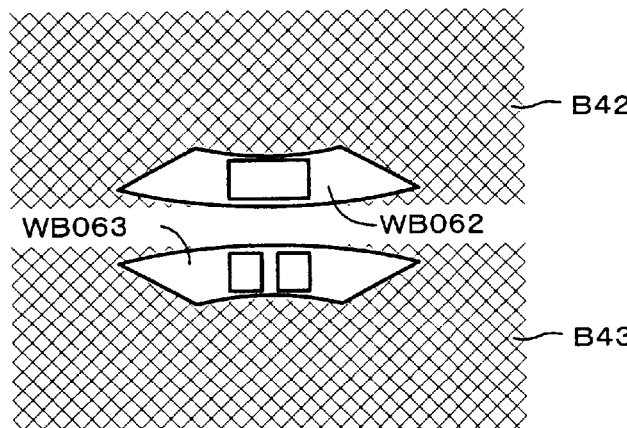
FIG.19D FAST FORWARD
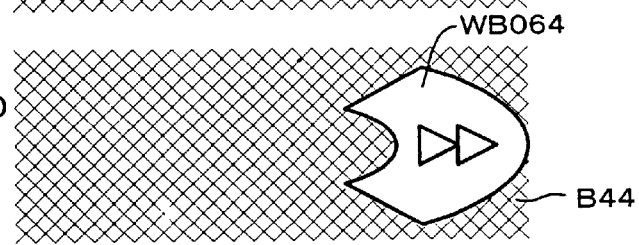
FIG.19E REWIND
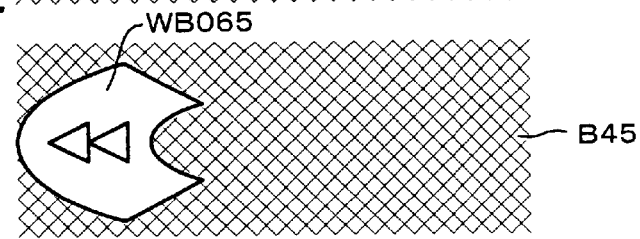
FIG.19F
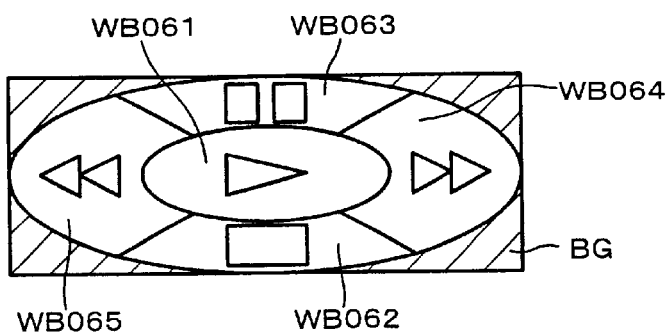

WINDOW DESIGN ALTERATION METHOD AND SYSTEM

BACKGROUND OF THE INVENTION

1. Field of the Invention

The present invention relates to a window design alteration method and a window design alteration system for altering the design of a window displayed on a screen of a computer running a graphical user interface. The method and the system have the capability of altering the outline of the design of a window by computer processing and also that of reinstating within the outline of the altered design of the window a function that the window had before the alteration.

2. Description of the Related Art

For example a goods sale data processing system is made up of a number of POS terminals (for example electronic cash registers) disposed in stores, POS servers directly managing the POS terminals, and a store server indirectly managing the POS terminals en bloc by way of the POS servers.

The POS servers and the store server are host machines to the POS terminals. Also, store servers of a large chain store are connected by a data communication network to a host computer (ultimate host) in the store headquarters.

In this goods sale data processing system, on the basis of instructions from store staff (operators) the POS terminals obtain goods data from goods files in a host machine (for example a POS server), and carry out product registration and accounting. Goods data and accounting data are displayed on the POS terminals. The goods data and accounting data are also printed with a printer in a journal and on a receipt. A total sum and an amount of change are calculated, and a draw is opened automatically.

Thus, by analyzing the goods data and the accounting data, store staff can perform complicated goods sale tasks and accounting tasks accurately and swiftly. And, on the host side, by analyzing store sales information (goods data and accounting data), store staff can determine store sales performances and the like.

The POS terminals and the computers constituting the store servers and so on run GUI (Graphical User Interface) environments. Accordingly, the POS terminals and computers are designed so that goods sale data processing and the like can be executed swiftly and accurately using windows displayed on a screen and mouse operation. That is, in the case of goods sale data processing, each POS terminal is designed so that it can be operated intuitively and easily even by beginner-level store staff. And the spread of personal computers owes much to the use of GUIs.

Here, 'window' displayed on the screen means at least one or the other of a region delimited on the screen and the function of displaying text or images in that region. Accordingly, 'windows' means not only ordinary frames but also buttons, images and icons having on/off-signal generating functions. Thus, in this specification, frames and buttons and so on are also defined as windows.

As a measure for making these POS terminals and computers easier to use, and to satisfy the demands of individual tastes, the simplification of the process of making design alterations on the screen has been being sought. Typical examples of design alterations in related art include the following. A first example is that of altering the design (layout) of a whole layout image, including the layout of windows. A second example is that of altering the designs of respective windows constituting a layout image while keeping the whole basic layout image on the screen.

In related art, the alteration method of the first example has been the method of dragging and dropping specified windows. And the alteration method of the second example has been the method of selecting a designed window and replacing or covering a selected original window with it. With either method, a specified (selected) window can be resized in the same shape by a mouse operation.

In business machines (for example, goods sale data processing machines), the tasks to be executed are predetermined. Because of this, there are inevitably a limited number of different basic layout images on the screen in which are placed various windows essential to different tasks. Layout images may differ no more than to the extent of for example the difference between one for use by a right-handed person and one for use by a left-handed person, or the difference between one with a credit card transaction processing function and one without, with the types (button, etc.) and number of windows in the layout image being unchanged.

However, these layout image design alterations are not sufficient to deal with different regional circumstances of chain stores, relationships with competitors, and average levels and subjective preferences of store staff. Consequently, there has been a need for the ability to alter the designs (shapes, outlines, colors, image textures, etc.) of windows constituting the design of a layout image. Also, there has been a strong need for the ability to alter the designs of windows in correspondence with different ranks, sales counters, or seasonally, and for different staff groups.

However, it is also often pointed out that a function (utility function) which an original window to be the object of a design alteration has (for example button function, on/off-signal generating function, etc.) should be made to function effectively only within the scope of the outline of the altered window. The reason for this is that depending on the design (shape, outline) of a window (for example a button) there may be the problem that when a store assistant presses a certain button (window) another button (window) is touched or pressed as well. And to avoid this it is necessary for the function to be kept within the scope of the outline of the altered window.

Therefore, creators have had to make programs and image data and the like so that windows of various designs and fixed designs which are combinations of these on the screen constitute individual and integrated products. Consequently, design alterations have led to increased costs, both in personnel and in time. And, not only have users had to get hold of design alteration specialists but there has been the disadvantage that business must be suspended while design alterations are made.

Also, it has been pointed out that, in a diversified, individualistic and discriminating society, it is not pleasing to the senses for the shapes and outlines of windows to be standardized for the most effective utilization of the size of the display (the display screen (background)). For example, the user of a personal computer might prefer to view fish (or the earth) displayed on its screen as if through a viewing window of a sightseeing boat (or a space ship). And a user sending a message by electronic mail to a special person might like to compose the message within a heart-shaped window.

In other words, the ability to alter the designs (especially the plane outline of the shape) of windows variously and furthermore simply would contribute greatly to the spread and popularization of GUI-based computers.

SUMMARY OF THE INVENTION

It is therefore a first object of the present invention to provide a window design alteration method with which it is possible to alter simply the design of a window displayed on a screen.

And it is a second object of the invention to provide a window design alteration system with which it is possible to practice this window design alteration method certainly and easily.

(1) One aspect of the present invention provides a window design alteration method by computer processing that alters a design of a window displayed on a screen of a computer running under a graphical user interface (GUI) environment, wherein a design of at least one window which is specified as an object of a design alteration from among windows being displayed on a screen, being automatically self-altered by a design self-alteration function of the specified window to the same design as at least one bit map selected from among bit maps that have been stored in a memory, and this automatic self-alteration is carried out so that a function included in the specified window is effective within an outline pertaining to a design after the automatic self-alteration.

With this aspect of the present invention, an operator (a window creator or a window user) specifies a window (for example a rectangular frame having a data display function or a button having an on/off-signal generating function) to be the object of a design alteration from among windows displayed on the screen of a computer (display part). And the operator selects a bit map of a design to which the window design is to be altered from among a number of bit maps that have been stored in a memory.

When the operator has specified a window and selected a bit map, a design self-alteration function of the specified window (itself) operates. That is, a design alteration program automatically self-alters the design [shape (outline), color, etc.] of the specified window to the same design as the design [shape (outline), color, etc.] of the selected bit map.

This automatic self-alteration is carried out with a function (data display function or on/off-signal generating function or the like) that the specified window had being effective within the scope of the outline pertaining to the automatically self-altered design (selected bit map). Outside this outline, the window no longer has the function. This area for example assumes the image background color.

The specified window may be either reduced or enlarged to the size of the selected bit map. In the case of reduction, the operator need not consider the original layout image on the screen. However, in the case of enlargement, the operator should consider the layout of the window on the original layout image before selecting a design of the selected bit map. This is because the altered window may overlap with other parts of the original layout image.

Thus, with this aspect of the present invention it is possible to alter simply and in various ways the design (shape, outline, color, image texture, etc.) of windows (frames, buttons, etc.) while maintaining their functions, without changing the basic layout image on the screen. As a result, the invention can make a substantial contribution to the further spread of GUI-based computers.

That is, for example in retail business machines this aspect of the present invention can cater for regional circumstances and competitors etc., and also for different staff groups or different average levels of store staff and their subjective preferences. Also, the invention can substantially simplify operation of a computer. Furthermore, the function of a window before the design alteration effectively functions only within the scope of the outline of the window after the design alteration. Consequently, for example problems such as touching an adjacent button when pressing an altered button can be avoided.

Also, it becomes unnecessary for creators to make programs and image data and so on with windows of various designs as fixedly individual and integrated finished products. As a result, creators can achieve large cost reductions in terms of both personnel and time. And because users can perform design alterations swiftly and easily without being design alteration specialists, they can improve their business efficiency. Also, with the invention, as is appropriate in a diversified, individualistic and discriminating society, it is possible to satisfy personal tastes and preferences relating to the shapes and outlines of windows.

(2) With the window design alternation method, the bit maps, which is raster data, may be stored in the memory with vector data that specifies relative position information of the bit maps, and the design self-alteration function may alter a design of the specified window to a design of the selected bit map so that the selected bit map is displayed in a predetermined position on the screen determined in relation to an outline of the specified window before the automatic self-alteration using the relative position information specified by the vector data.

In this case, the bit maps in the memory, which are raster data, are stored specified relative position information in a relationship with vector data. The design self-alteration function automatically self-alters the specified window to the design of the selected bit map with accompanying vector data. The position in which the specified window (selected bit map) is displayed on the screen after the design alteration is determined in relation to the outline of the specified window before the automatic self-alteration using the relative position information specified by the vector data.

Consequently, with this aspect of the present invention, the operator can easily distinguish the display position of the specified window (selected bit map) after the design alteration with respect to the display position of the specified window before the design alteration. That is, whether in the case of a design reduction, when the outline (shape, plan size) of the selected bit map is smaller than the outline (shape, plan size) of the specified window, or in the opposite case of a design enlargement, the invention makes window design alterations which match the overall layout image easy.

(3) With the window design alteration method, the selected bit map may be displayed on the screen with an outline and color which pertain to a design of the selected bit map and a region between an outline based on the vector data and an outline of the bit map may be displayed in a color different from a display color of the selected bit map.

In this case, the selected bit map is displayed on the screen with the outline and colors pertaining to its design. And the region between the outline based on vector data and the outline of the bit map is displayed with a color (such as 'pink', which is rarely used) different from the display color of the bit map (often 'silver' in the case of buttons and the like).

After the design alteration of the specified window, because the pink region is not bit map, it is not displayed on the screen. In other words, the operator can ascertain clearly and exactly a guide to the display position of the outline (shape, plan size) of the specified window (bit map) after the design alteration with respect to the outline (shape, plan size) of the specified window before the design alteration.

Thus the operator can distinguish still more easily the display position of the specified window (selected bit map) after the design alteration with respect to the display position of the specified window before the design alteration, and the handling of windows in connection with design alterations becomes much easier for the operator.

(4) With the window design alteration method, an outline based on the vector data may be the same as an outline of the specified window.

In this case, the outline of a for example rectangular specified window is the same as the outline based on the vector data corresponding to the selected bit map. The outline (shape) of the bit map inside the outline based on the vector data may be an outline other than the outline (shape) based on the vector data (for example a round-cornered rectangle or a circle, etc.).

That is, design alterations can be made with the selected bit map displayed in a predetermined position on the screen with the outline based on the vector data accompanying the selected bit map aligned with the outline of the specified window.

Consequently, the invention makes it possible to perform design alterations of buttons (windows) more simply while maintaining the overall layout image.

(5) With the window design alteration method, the design self-alteration function may scan the selected bit map and may automatically self-alter an outline pertaining to a design of the specified window in accordance with a result of the scanning.

In this case, the design self-alteration function scans the selected bit map for example in a horizontal scanning direction and a vertical scanning direction. Then, in accordance with the scanning results (the outline of the bit map), the outline pertaining to the design of the specified window is automatically self-altered. In the case of a bit map with accompanying vector data, the design alteration of the specified window is made using position information with respect to the outline of the bit map based on the vector data of the bit map.

Consequently, the invention can be applied whatever the shape of the bit map and can maintain the display clarity of the bit map outline after the design alteration.

(6) With the window design alteration method, when a plurality of windows displayed overlapping on the screen and each of which the function is a button function are specified and bit maps of designs indicating buttons for the respective specified windows are selected, the selected bit maps after the automatic self-alteration of the specified windows may be displayed together without overlapping one another so as to be displayed as a plurality of buttons combined on the same plane.

In this case, the operator may specify a plurality of windows which can be displayed overlapping on the screen. The function of each of the specified windows is a button function. And, the operator may select bit maps of designs indicating buttons corresponding to the specified windows. Then, the specified windows automatically self-alter to the respective selected bit maps. The bit maps (windows) after the automatic self-alteration of the specified windows are displayed together without overlapping one another. As a result the specified windows are displayed as a planar combination of a plurality of buttons.

Thus with this system it is possible to alter for example buttons for image control use (play, stop, pause, fast forward, . . . ) to a unique design in which they are combined in the shape of a rectangular or an ellipse.

(7) With the window design alteration method, when one type of bit map of a design indicating a button is selected with respect to one specified window displaying a plurality of buttons having the same design, the design self-alteration function may automatically self-alter designs of the buttons of the specified window to a design of a button of the selected bit map at one time.

In this case, the operator may specify one window able to display a plurality of buttons having the same design and then select one bit map of a design indicating a button. Then, the design self-alteration function automatically self-alters en bloc the design of each of the buttons of the specified window to the design of the button of the selected bit map. The alterations may alternatively be executed in succession (for example, in the order in which the buttons are lined up).

Thus with this aspect of the present invention it is possible to alter the design of the buttons in a window simply and swiftly.

(8) With the window design alteration method, when one type of bit map of a design indicating a button is selected with respect to a plurality of specified windows displayed on the screen overlapping and displaying buttons having the same design, the design self-alteration function may automatically self-alter the designs of the buttons of the specified windows to a design of a button of the selected bit map at one time.

In this case, an operator may specify a plurality of windows displayed overlapping on the screen and capable of displaying a plurality of buttons having the same design and select one bit map of a design indicating a button. Then, the design self-alteration function automatically self-alters en bloc the design of the buttons of the specified windows to the design of the button of the selected bit map. The alterations may alternatively be executed in succession (for example, in the order in which the buttons are lined up).

Thus it is possible with this aspect of the present invention to alter the design of the buttons in a number of windows simply and swiftly.

(9) With the window design alteration method, designs of the specified windows maybe automatically self-altered so that a design of each of the specified windows is altered to two designs corresponding to buttons of two selected bit maps, and when one of the buttons which is being displayed is operated, another of the buttons which has not been displayed until then may be displayed and the one of the buttons which has been displayed until then may be to be switchable to non-display state.

In this case, the operator may specify one window (button) and select two button (window) bit maps having different designs. Then, the design self-alteration function alters the design of the button of the specified window to two designs corresponding to the buttons of the two selected bit maps.

After the automatic self-alteration, when one of the buttons being displayed is operated, another of the buttons which had not been displayed until then is displayed and the one of the buttons which had been displayed until then switches to non-display state. In other words, the buttons are oppositely switched between ON (bold) and OFF (withdrawn). However, as the order of alteration, preferably the button altered first is operated to make its on/off-signal generating function work and then the design of the remaining button is altered. This is because these buttons must be displayed alternately in the same plan position.

Thus, with this aspect of the present invention it is possible to alter a button having an on/off-signal generating function to a design which makes the user feel a sense of presence.

(10) With the window design alteration method, a design of each of standard windows in a standard layout image in which a plurality of types of the standard windows are displayed on the screen may be automatically self-altered to a design of selected bit map for each of the specified standard windows, and an overall image design of the screen may be changed by altering a design of each of the standard windows while maintaining the standard layout image.

In this case, the operator may start the design self-alteration function on executing for example a card processing task or a game. When this happens, for example a preset standard layout image suitable for executing the task is displayed on the screen. In this standard layout image, a plurality of types of standard window (frames, buttons, etc.) are displayed.

Here, the operator specifies a desired standard window and selects a bit map for this specified window. Then, the specified standard window automatically self-alters to the design of the selected bit map. Design alterations can be made in the same way for other specified standard windows as well. Thus, while holding the standard layout image the operator can alter the design of the overall image on the screen through design alterations to individual standard windows.

Accordingly, with this aspect of the present invention, while keeping the standard layout image and guaranteeing its operability, by altering the design of individual windows it is possible to alter the design of the overall image on the screen. As a result, the utility of the system is high and it can cater to the tastes of any user.

(11) With the window design alteration method, each of the standard windows displayed on the screen may be a window for giving an instruction for performing goods sale data processing and displaying a result of the processing.

In this case, when the operator requests the execution of goods sale data processing (goods registration, accounting, etc.), a standard layout image including for example standard windows (buttons) for giving an instruction for executing this processing and standard windows (data display regions) for displaying results of goods sale data processing is displayed on the screen.

As a result, with this aspect of the present invention the task can be executed highly efficiently. Also, because with this aspect of the present invention it is possible to make design alterations to standard windows for example corresponding to different levels of store staff, the applicability of the system is wide.

(12) With the window design alteration method, the memory may store a plurality of the standard layout images, and an arbitrary standard layout image selected from among the plurality of the standard layout images may be displayed on the screen.

In this case, a number of standard layout images (for example a image relating to goods sale data processing for use by a right-handed person and one for use by a left-handed person) have been stored in the memory. And by referring to a standard layout image selection menu box displayed on the basis of a request for the execution of goods sale data processing or by a key operation, for example, a right-handed operator selects the standard layout image for use by a right-handed person. The operator can then conduct the data processing using this standard layout image, and can also make design alterations to the standard window.

Thus, with this aspect of the present invention it is possible to switch selectively even the highest-level windows (the standard layout images made up of standard windows). As a result, the invention can promote the diversification of window designs and is highly convenient.

(13) With the window design alteration method, the selected bit map may have been selected using a selection menu displayed on the screen.

In this case, the operator can select bit maps corresponding to specified windows using selection menus displayed on the screen.

As a result, the selection operation in the invention is easier than when the operator makes selections by key input and so on.

(14) Another aspect of the present invention provides a window design alteration system capable of altering by computer processing a design of a window displayed on a screen of a computer running under a graphical user interface (GUI) environment, comprising:

window display control means for displaying at least one window having a function on the screen;

window specifying means for specifying at least one of the windows to be the object of a design alteration from among the windows displayed on the screen;

a memory storing a plurality of bit maps;

bit map selecting means for selecting at least one of the bit maps from among the bit maps stored in the memory;

design self-alteration control means for automatically self-altering a design of the specified window specified by the window specifying means to the same design as the selected bit map selected by the bit map selecting means and for executing the automatic self-alteration, so that a function included in the specified window is effective within an outline pertaining to a design after the automatic self-alteration; and altered window display control means for displaying the specified window, on which the automatic self-alteration has been executed, in a position on the screen determined in relation to a position of the specified window before the automatic self-alteration.

The window display control means displays windows (frames, buttons, etc.) having functions on the screen. When wanting to change the design of one of these windows, the operator uses the window specifying means to specify any window to be the object of the design alteration from among the windows displayed on the screen. And, the operator uses the bit map selecting means to select any bit map from among the plurality of bit maps stored in memory.

Then, the design self-alteration control means automatically self-alters the design of the window specified with the window specifying means to the same design as the design of the bit map selected with the bit map selecting means.

In this automatic self-alteration, any function which the specified window had is effective within the scope of the outline pertaining to the automatically self-altered design (the selected bit map). The altered window display control means then displays the automatically self-altered window in a position on the screen determined in relation to the specified window before the automatic self-alteration.

The specified window may be either reduced or enlarged to the size of the selected bit map. In the case of reduction, the operator need not consider the original layout image on the screen. However, in the case of enlargement, the operator should consider the layout of the window on the original layout image before selecting a design of the selected bit map. This is because the altered window may overlap with other parts of the original layout image.

Thus, with this aspect of the present invention it is possible to alter simply and in various ways the design (shape, outline, color, image texture, etc.) of windows (frames, buttons, etc.) while maintaining their functions, without changing the basic layout image on the screen. As a result, the system can make a substantial contribution to the further spread of GUI-based computers. Also, the invention is easy to use and is of high utility.

That is, for example in retail business machines this aspect of the present invention can adapt to regional circumstances and competitors etc., and also to different staff groups or different average levels of store staff and their subjective preferences. Also, the system can substantially simplify operation of a computer. Furthermore, the function of a window before the design alteration effectively functions only within the scope of the outline of the window after the design alteration. Consequently, for example problems such as touching an adjacent button when pressing an altered button can be avoided.

And, it becomes unnecessary for creators to make programs and image data and so on with windows of various designs as fixedly individual and integrated finished products. As a result, creators can achieve large cost reductions in terms of both personnel and time. And because users can perform design alterations swiftly and easily without being design alteration specialists, they can improve their business efficiency. Also, with this aspect of the present invention, as is appropriate in a diversified, individualistic and discriminating society, it is possible to satisfy personal tastes and preferences relating to the shapes and outlines of windows.

(15) Further aspect of the present invention provides a window design alteration system capable of altering by computer processing a design of a window displayed on a screen of a computer running under a graphical user interface (GUI) environment, comprising:

window display control means for displaying a plurality of windows displayed overlapping on the screen, a function of each of which being a button function;

window specifying means for specifying a plurality of windows to be objects of design alteration from among the windows displayed overlapping on the screen;

a memory storing a plurality of bit maps;

bit map selecting means for selecting a plurality of bit maps corresponding to the respective specified windows from among the bit maps stored in the memory;

design self-alteration control means for automatically self-altering designs of the specified windows specified by the window specifying means to the same designs as the respective selected bit maps selected by the bit map selecting means and for executing the automatic self-alteration, so that a function included in each of the specified windows is effective within an outline pertaining to a design after the automatic self-alteration; and altered window display control means for displaying together the selected bit maps, on which the automatic self-alteration has been executed, without overlapping one another, so as to display a plurality of buttons combined on the same plane.

In this case, the window display control means displays overlapping on the screen a number of windows (buttons) the function of each of which is a button function. When wanting to change the design of some of these windows (buttons), the operator uses the window specifying means to specify windows to be the objects of the design alteration from among the windows displayed overlapping on the screen. And, the operator uses the bit map selecting means to select a number of bit maps (buttons) to correspond to the windows (buttons) specified using the window specifying means from among a plurality of bit maps stored in the memory.

When the operator has specified the windows and selected the bit maps, the design self-alteration control means automatically self-alters the designs of the windows specified with the window specifying means to the same designs as the designs of the bit maps selected with the bit map selecting means.

In this automatic self-alteration, the button functions which the specified windows had are effective within the outlines pertaining to the design (the selected bit maps) of the respective automatically self-altered windows. And the altered window display control means displays together the automatically self-altered bit maps without overlapping one another as a planar combination button made up of a plurality of buttons contiguous in the same plane.

The specified windows may be either reduced or enlarged to the sizes of the selected bit maps. In the case of reduction, the operator need not consider the original layout image on the screen. However, in the case of enlargement, the operator should consider the layout of each of the windows on the original layout image before selecting a design of the selected bit map. This is because altered bit maps (buttons) may overlap.

Thus, with this aspect of the present invention it is possible to alter simply and in various ways the designs (shape, outline, color, image texture, etc.) of windows (frames, buttons, etc.) while maintaining their functions, without changing the basic layout image on the screen. That is, with this aspect of the present invention it is possible to alter for example buttons for image control use (play, stop, pause, fast forward, . . . ) to a unique design in which they are combined in the shape of a rectangular or an ellipse. As a result, the invention can make a substantial contribution to the further spread of computers using GUIs. Also, the invention is simple to handle and is of high utility.

That is, for example in retail business machines this aspect of the present invention can adapt to regional circumstances and competitors etc., and also to different staff groups or different average levels of store staff and their subjective preferences. Also, the system can substantially simplify operation of a computer. Furthermore, the button functions of windows before design alterations effectively function only within the scope of the outlines of the windows after the design alteration. Consequently, for example problems such as touching an adjacent button when pressing an altered button can be avoided.

Also, it becomes unnecessary for creators to make programs and image data and so on with windows (buttons) of various designs as fixedly individual and integrated finished products. As a result, creators can achieve large cost reductions in terms of both personnel and time. And because users can perform design alterations swiftly and easily without being design alteration specialists, they can improve their business efficiency. Also, as is appropriate in a diversified, individualistic and discriminating society, it is possible to satisfy personal tastes and preferences relating to the shapes and outlines of buttons (windows).

(16) The window design alteration system may further comprise selection menu display control means for displaying a selection menu on the screen so that an arbitrary bit map is selected from among the bit maps stored in the memory, and the bit map selecting means may execute selection with reference to the displayed selection menu.

In this case, the selection menu display control means displays on the screen a selection menu so that any bit map can be selected from among the bit maps stored in the memory. And with the bit map selecting means it is possible to select any bit map with reference to the displayed selection menu.

Thus the invention is easy to handle and makes it possible to carry out the bit map selection operation swiftly and exactly.

(17) Bit maps stored in the memory may be stored in the memory as another format data of a format other than bit map format and the other format data may be converted to the bit map format before the automatic self-alteration control means executes an automatic self-alteration operation.

In this case, the bit maps are stored in the memory as data in formats other than bit map (for example JPEG-compressed data) This other format data is converted to bit map data before the design self-alteration control means executes an automatic self-altering operation.

Thus the invention allows the memory to be made small or many more different bit maps to be held.

(18) The screen may be a screen for an operator's display for informing the operator of goods sale data to be processed by a goods sale data processing machine.

In this case, the screen is a screen for the operator's display for informing the operator of the goods sale data to be processed by the goods sale data processing machine. And the design of the window in the image of the screen can be altered.

The present invention can make it possible to execute goods sale data processing tasks with high efficiency. Also, because with the present invention it may be possible to make design alterations to multiple types of windows (frames, buttons, etc.) for example corresponding to different levels of store staff, the applicability of the invention is wide.

BRIEF DESCRIPTION OF THE DRAWINGS

FIGS. 19A through 19F are views illustrating a second example of a combination button after the design alteration.

DETAILED DESCRIPTION OF THE PREFERRED EMBODIMENTS

Preferred embodiments of the invention will now be described, with reference to the drawings.

Figure 1:
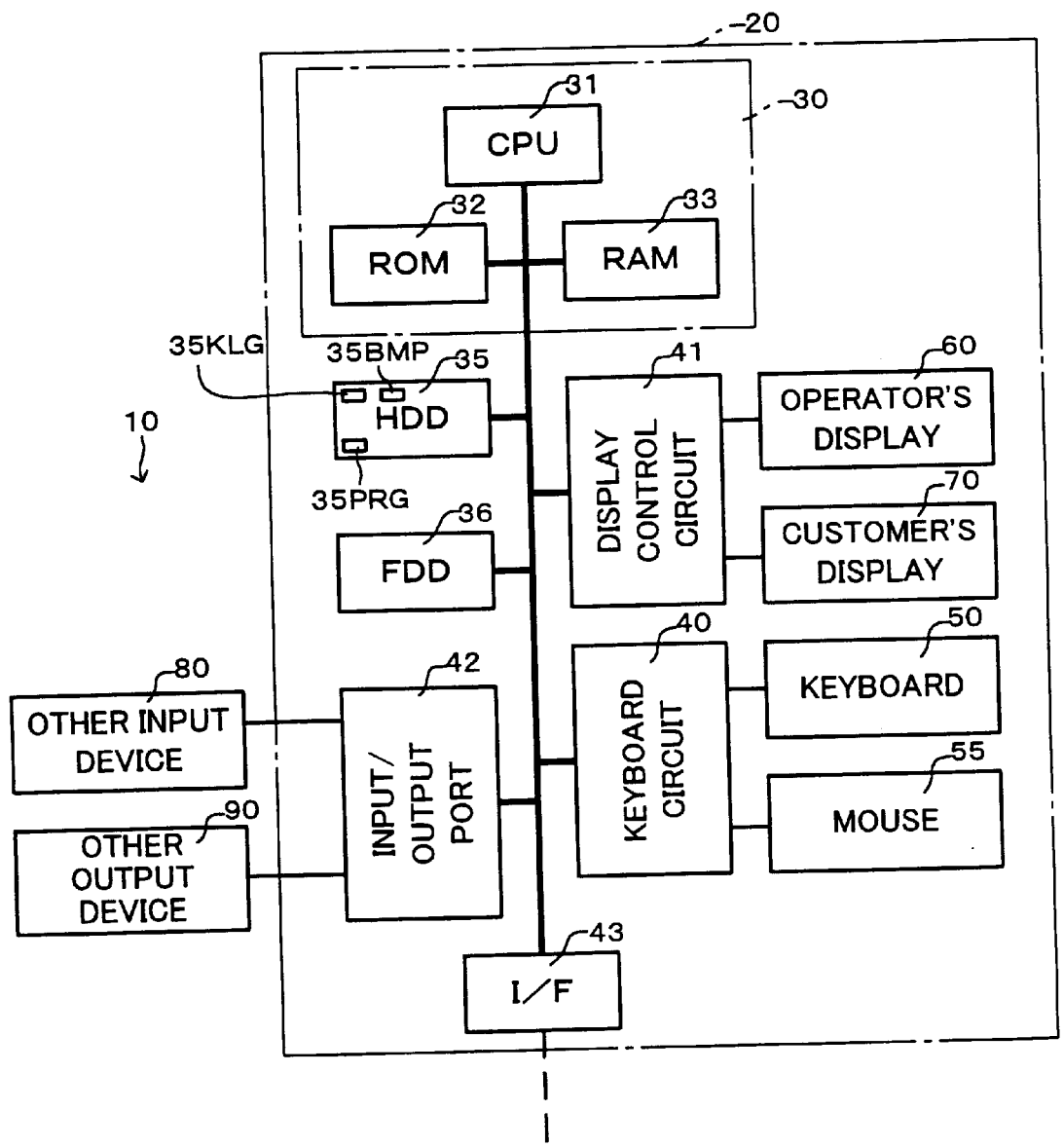
FIG. 1 is a block diagram showing a preferred embodiment of the invention.

As shown in FIG. 1, the basic construction of a design alteration system suitable for working a window design alteration method according to the invention may be provided in the form of an electronic cash register 10 (personal computer 20).

This system functions as window display control means (30), window specifying means (55), bit map selecting means (55), design self-alteration control means (30, 41), and altered window display control means (30, 41).

The system is constructed to enable an operator to specify as the object of the design alteration any window from among windows having a function (utility function) displayed on a screen 60G of a display (60), and is also constructed to enable the operator to select any bit map from among a plurality of bit maps stored in a memory (35 BMP).

Also, the system is constructed to be able to automatically self-alter the design of a specified window to the same design as the design of a selected bit map. And when executing this automatic self-alteration, the utility functions associated with the specified window are effective within the outline pertaining to the design after the self-alteration (the selected bit map). The system is also able to display the automatically self-altered window in a position on the screen 60G determined in relation to the window before the automatic self-alteration.

The electronic cash register 10 in FIG. 1, which is a goods sale data processing machine, consists mainly of a personal computer 20 having a control part (a CPU 31, ROM 32, RAM 33 and so on) 30, an HDD 35, an FDD 36, a keyboard 50, a mouse 55, an operator's display 60, a customer's display 70, input/output ports 42 and a communication interface 43. The electronic cash register 10 executes goods sale data processing (goods registration and accounting, etc.).

In FIG. 1, the reference numeral 40 denotes a keyboard circuit and 41 a display control circuit. Other input devices (scanner, card reader, etc.) 80 and output devices (printer, card writer, automatically opening drawer, etc.) 90 necessary for executing goods sale data processing are connected to the control part 30 via the input/output ports 42.

Program files 35 PRG holding various programs pertaining to goods sale data processing are provided on the HDD 35. In addition to the program files 35 PRG there are standard layout image files 35 KLG holding for example standard layout images WL01, WL02 shown in FIG. 5 and FIG. 6 and the like and bit map files (memory) 35 BMP storing a plurality of bit maps. All the files are loaded to the RAM 33 for use.

Figure 9:
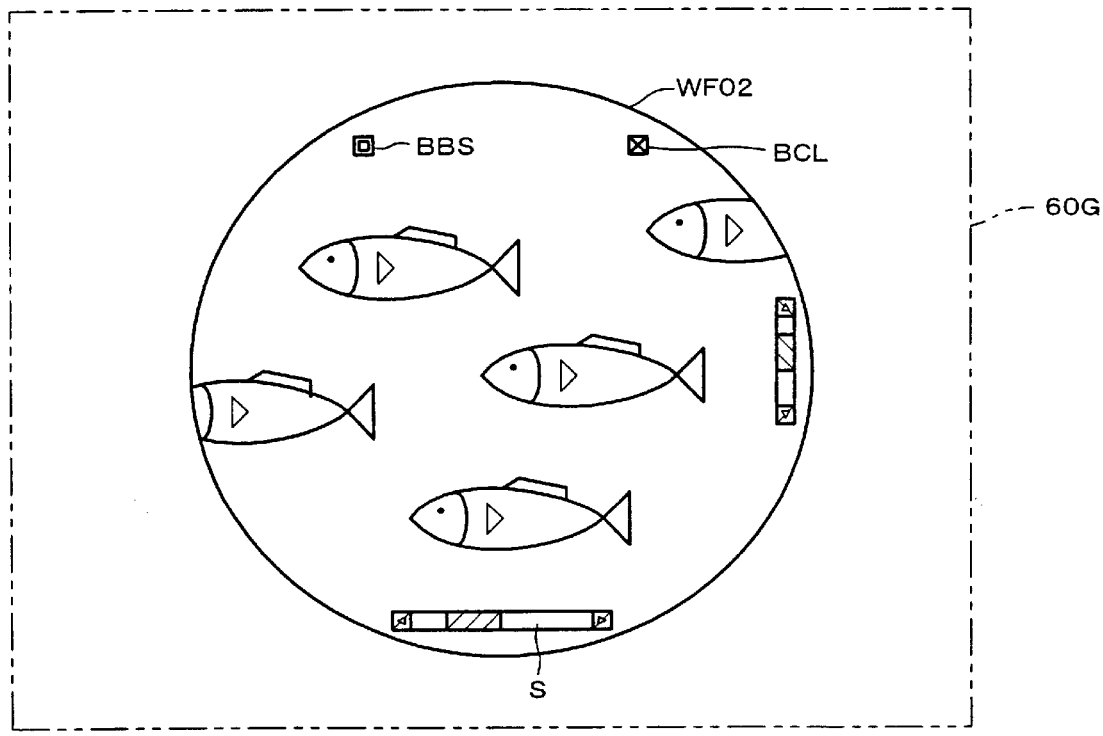
FIG. 9 is a view illustrating a selected frame (round)
Figure 10:
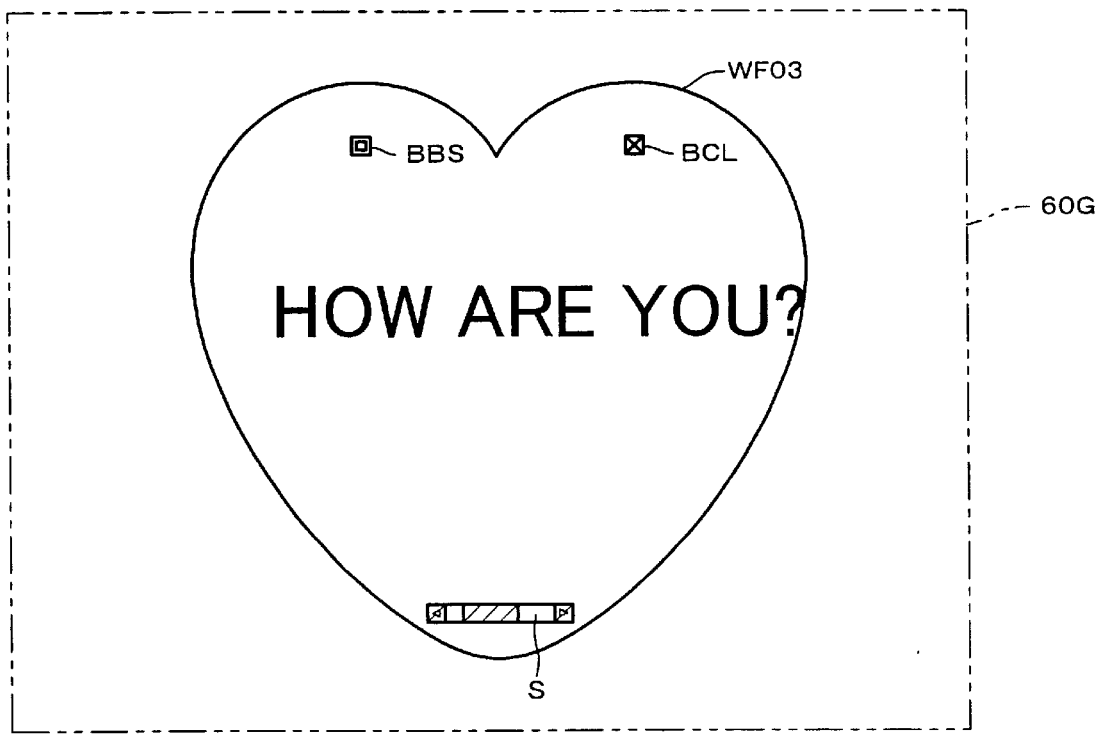
FIG. 10 is a view illustrating another selected frame (heart-shaped)
Figure 13A:
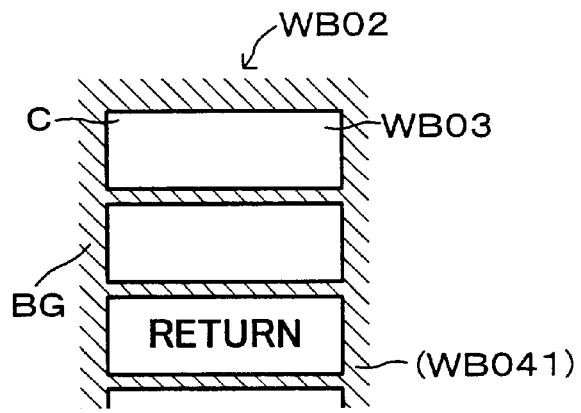
FIGS. 13A through 13C are views illustrating a specified window (button) and a selected bit map and the window (button, bit map) after a design alteration has been made to it.
Figure 13B:
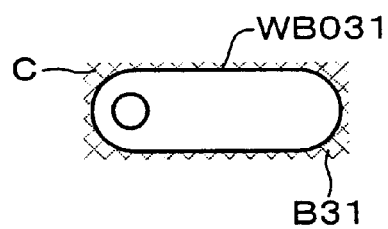

The bit maps stored in the memory (35 BMP) include for example a button (window) WB031 shown in FIG. 13B, buttons (windows) WB05 1 through WB055 shown in FIG. 18 and buttons (windows) WB061 through WB065 shown in FIG. 19, and also a circular frame (window) WFO2 shown in FIG. 9 and a heart-shaped frame (window) WF03 shown in FIG. 10.

The bit maps stored in the memory (35 BMP) can be stored in this memory (35 BMP) as data of a format other than bit map (for example compressed image data such as JPEG or GIF). This other format data is converted to bit map data before an automatic self-alteration operation is executed by the design self-alteration control means (30). Preferably, data conversion and display are possible at the time of selection menu display in the automatic self-alteration operation.

Figure 5:
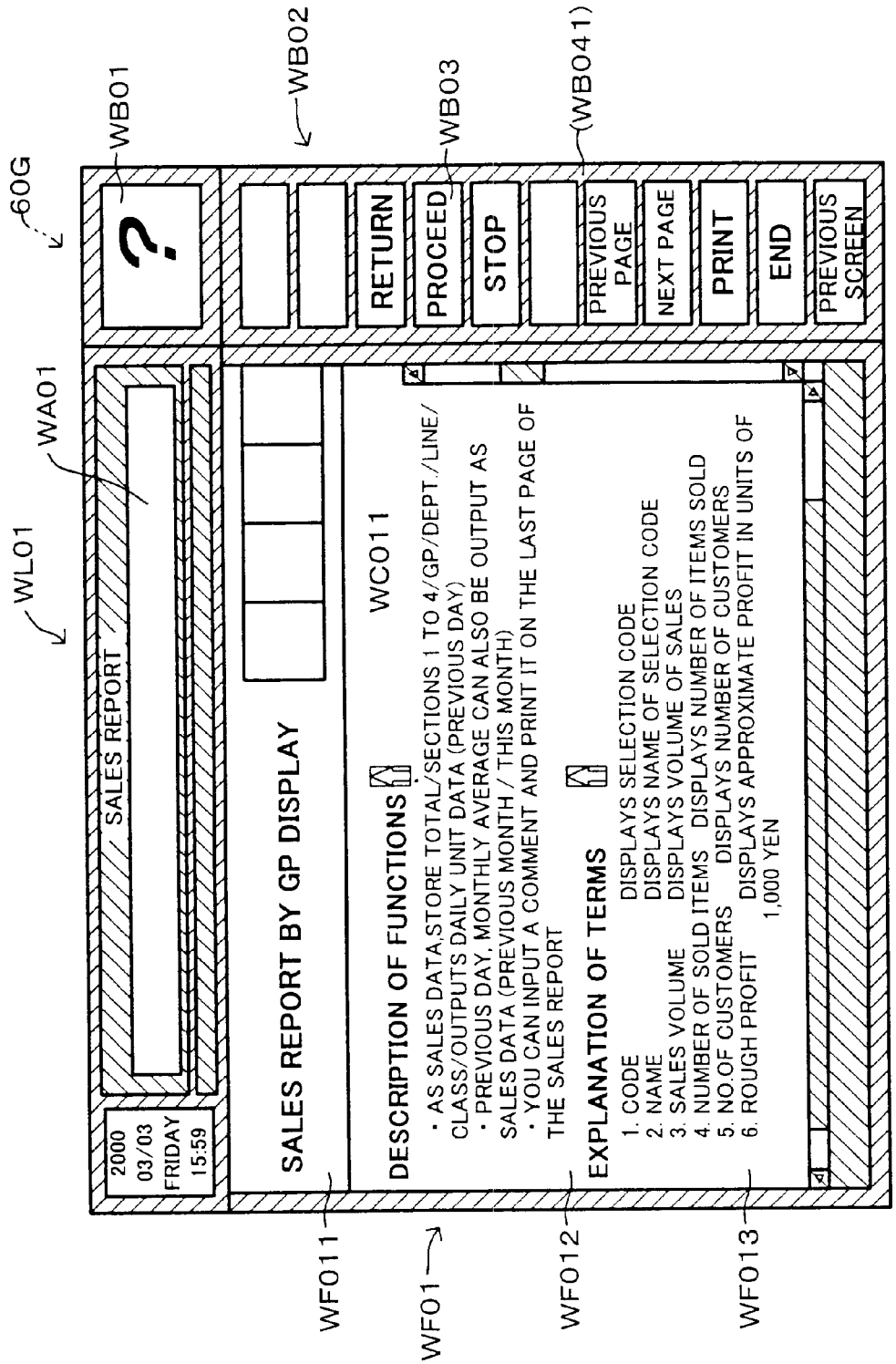
FIG. 5 is a view of a standard layout image (a rectangular frame for a right-handed user)
Figure 6:
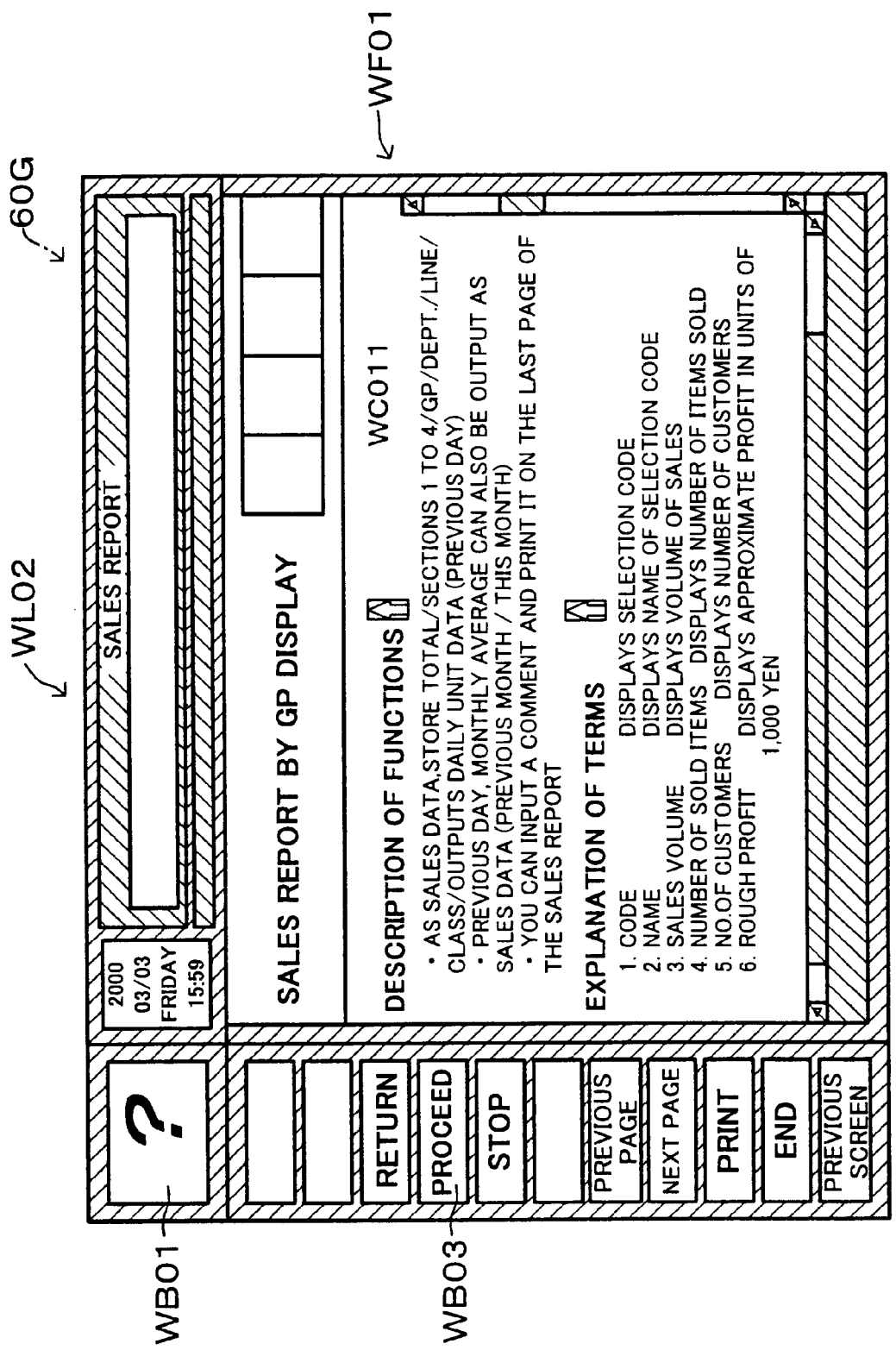
FIG. 6 is a view of another standard layout image (a rectangular frame for a left-handed user)

Here, the standard layout images WL01, WL02 shown in FIG. 5 and FIG. 6 are held in the standard layout image files 35 KLG; however, alternatively these may be stored in relation with the goods sale data processing programs held in the program files 35 PRG, integrally with the programs.

In FIG. 5 and FIG. 6, the standard layout images WL01, WL02 indicate layout standards in the image of a standard window. Here, a standard layout is for example a standard window for giving instructions for executing goods sale data processing and displaying results of that processing. FIG. 5 shows a standard layout image WL01 for a right-handed operator and FIG. 6 a standard layout image WL02 for a left-handed operator. In FIG. 5 and FIG. 6, a navigation strip WB02 is disposed in left-right opposite positions on the screen 60G.

Taking the example of FIG. 5, the standard layout image WL01 will now be described.

In FIG. 5, the standard layout image WLO1 includes an alarm frame (window) WA01 for displaying information relating to the system state and warnings and so on; an application frame (window) WF01 for displaying information necessary for executing applications (goods sale data processing programs) and results of processing; a help button (window) WB01; and the navigation strip WB02. The navigation strip WB02 includes a number of navigation buttons (windows) WB03. The standard layout image WL01 is displayed on the screen 60G of an operator's display 60 for informing an operator of goods sale data and so on.

The application frame (window) WF01 is a combination of a frame (window) WF011 for displaying sales reports or the like, a frame (window) WF012 for displaying brief explanations of available functions, and a frame (window) WF013 for displaying explanations of terms.

As in an ordinary case, the whole of the standard layout image WL01 can be resized up to and down from the full size of the rectangular image of the screen 60G (see the screen 60G shown with dashed lines in FIG. 9 and FIG. 10) by dragging and dropping a corner or a side of the frame with a mouse pointer.

When this resizing is done, here, because the rectangular frames (windows) WA01, WFO1, WB01 and WB03 of FIG. 5 are independent, they maintain their original shapes (sizes and outlines). However, alternatively they can be made to resize in correspondence with resizing of the standard layout image WL01, retaining fixed size ratios with respect thereto.

Figure 2:
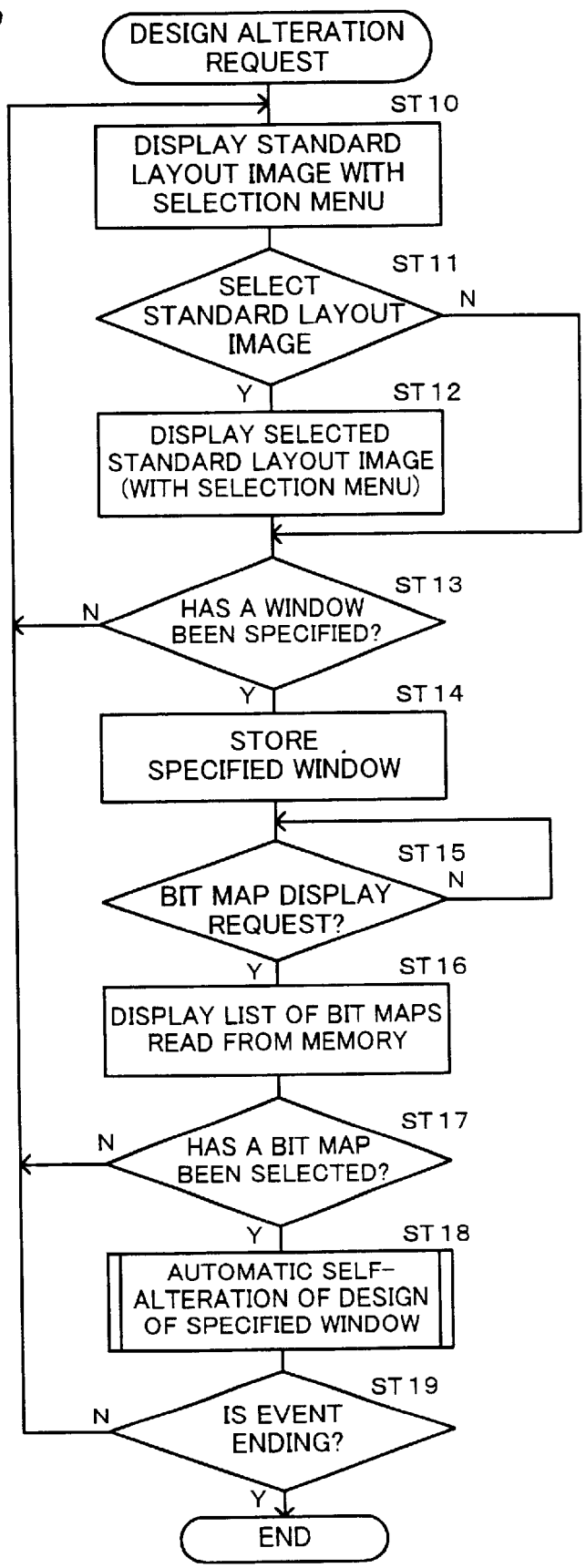
FIG. 2 is a flow chart illustrating the overall operation of the invention.

Here, the window display control means (the control part 30) displays windows (frames, buttons, etc.) having utility functions (data display function, on/off-signal generating function, etc.) on the screen 60G (ST12 of FIG. 2).

Next, window design alteration will be described. FIG. 2 is a flow chart showing an example of design alteration processing.

In this preferred embodiment, when the design alteration request is made by an operator, the standard layout image WL01 for a right-handed operator shown in FIG. 5 is displayed on the screen 60G of the operator's display 60 (ST10 of FIG. 2). When wanting to display the image for a left-handed operator, by using the selection menu shown in FIG. 4, which is displayed on the screen 60G along with the standard layout image WL01, the operator can change the display by choosing the standard layout image WL02 shown in FIG. 6 (ST11: YES, ST12).

Figure 4:
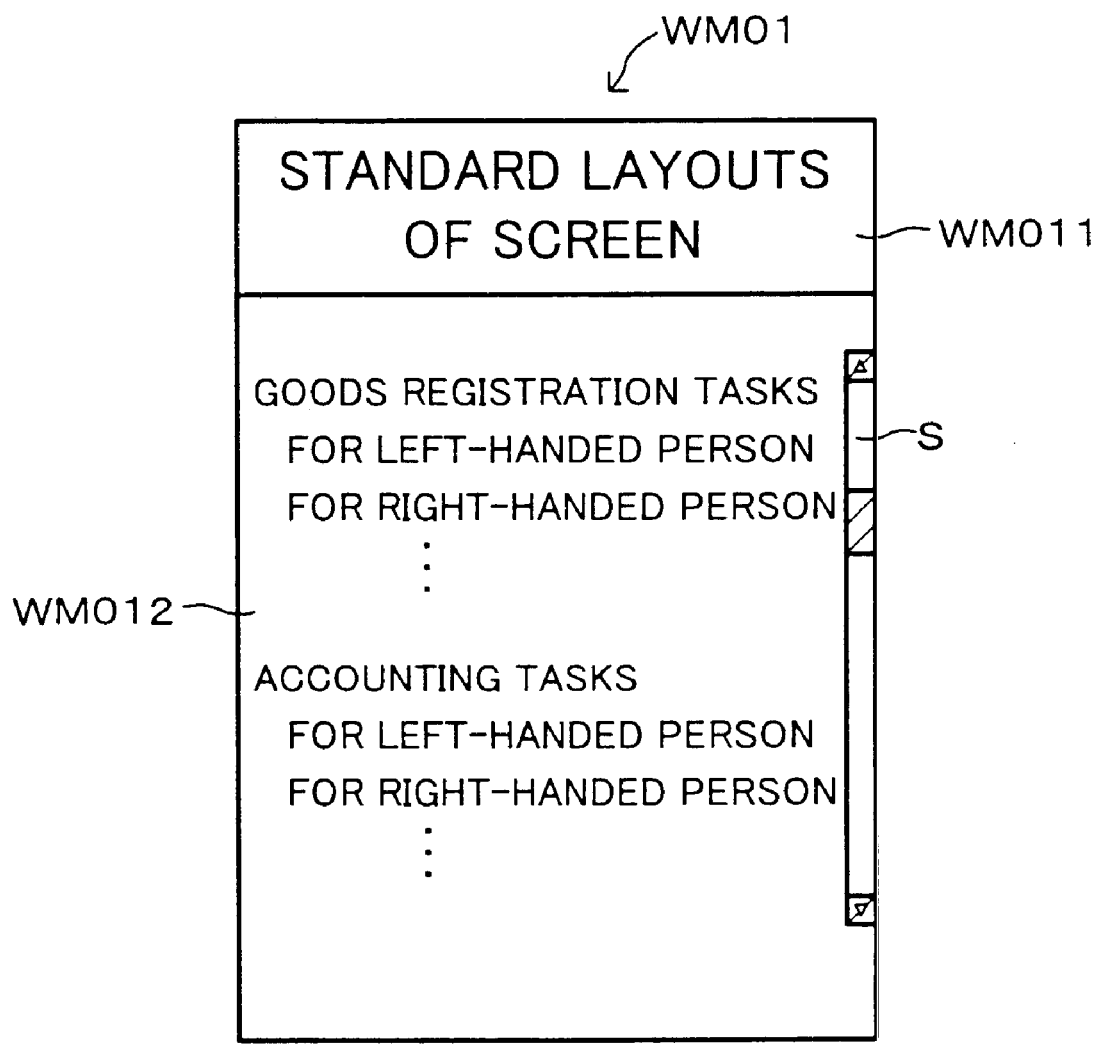
FIG. 4 is a view of a selection menu for selecting a standard layout.

As shown in FIG. 4 (but omitted in FIG. 5 and FIG. 6), this selection menu (frame) WM01 is made up of a menu title display frame (window) WM011 for displaying its title (Standard Layouts of Image) and a selection menu display frame (window) WM012 for displaying a menu so that one standard layout image (for example, a standard layout image which is for goods registration and for use by a left-handed operator) can be selected from among a number of different standard layout images. The utility functions of the windows WM01, WM011, WM012 are data display functions. S denotes a scroll bar.

The standard layout image (WL01 of FIG. 5) is read from the standard layout image files 35 KLG (ST10) when a switch to a goods registration (goods sale data processing) mode is made. And when a switch is made to a setting mode, a test mode or a accounting mode, a standard layout image (not shown) associated with that mode is displayed.

The window specifying means is means for specifying any window among windows displayed on the screen 60G to be the object of the design alteration, and in this preferred embodiment is provided in the form of the mouse 55 shown in FIG. 1. Alternatively it may be provided using for example the keyboard 50.

Figure 11:
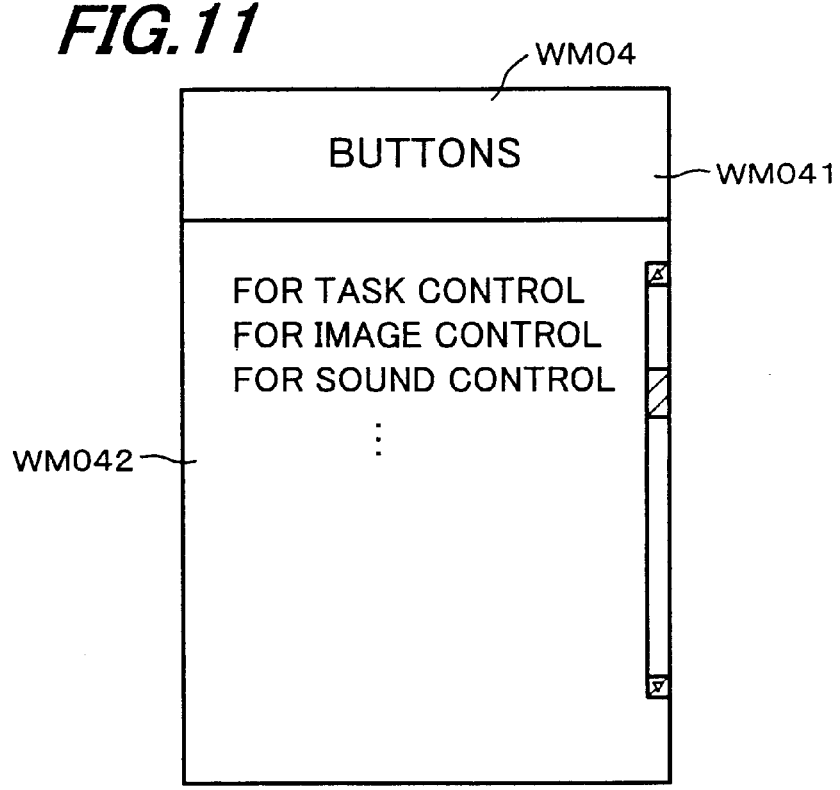
FIG. 11 is a view of a selection menu for selecting a button.

Then, using the window specifying means (55) while referring for example to a specification menu shown in FIG. 11, the operator specifies for example a button (window) WB03 displayed in the standard layout image WL01 shown in FIG. 5 (ST13: YES in FIG. 2). Following this, a bit map selection is carried out.

Specifically, the operator specifies a window using a specification menu (frame) WM04 shown in FIG. 11 (but omitted in FIG. 5). This specification menu (frame) WM04 includes a menu title display frame (window) WM041 for displaying the menu title (Buttons) and a specification menu display frame (window) WM042 for displaying a menu so that one button (for example, a button for task control use) can be specified from among a number of different buttons.

Here, using the specification menu shown in FIG. 11, the operator specifies a button WB03 shown in FIG. 5 and FIG. 13A, which is a standard window for task control use (ST13: YES). The specified window (WB03) is then stored in the RAM 33 (ST14).

Then, when by a key operation or the like the operator makes a bit map display request (ST15: YES), bit maps read from memory (the bit map files 35 BMP) corresponding to that window (the button WB03) are listed in a predetermined format (for example in a thumbnail format) (ST16) (not shown).

In this preferred embodiment there are provided selection menu display control means (the control part 30), and this selection menu display control means displays on the screen 60G a selection menu for selecting any bit map from among the bit maps stored in the memory (35 BMP). And using the bit map selecting means (55), the operator can select any bit map with reference to the displayed selection menu.

In this way, the operator selects one bit map using the bit map selecting means (55). Specifically, using a lower selection menu WM05, shown in FIG. 12, displayed on the screen 60G along with the list display of the bit maps, the operator selects the rounded rectangular shape (rectangular shape having rounded corners) shown in FIG. 13B (button WB031) (ST17: YES).

Figure 12:
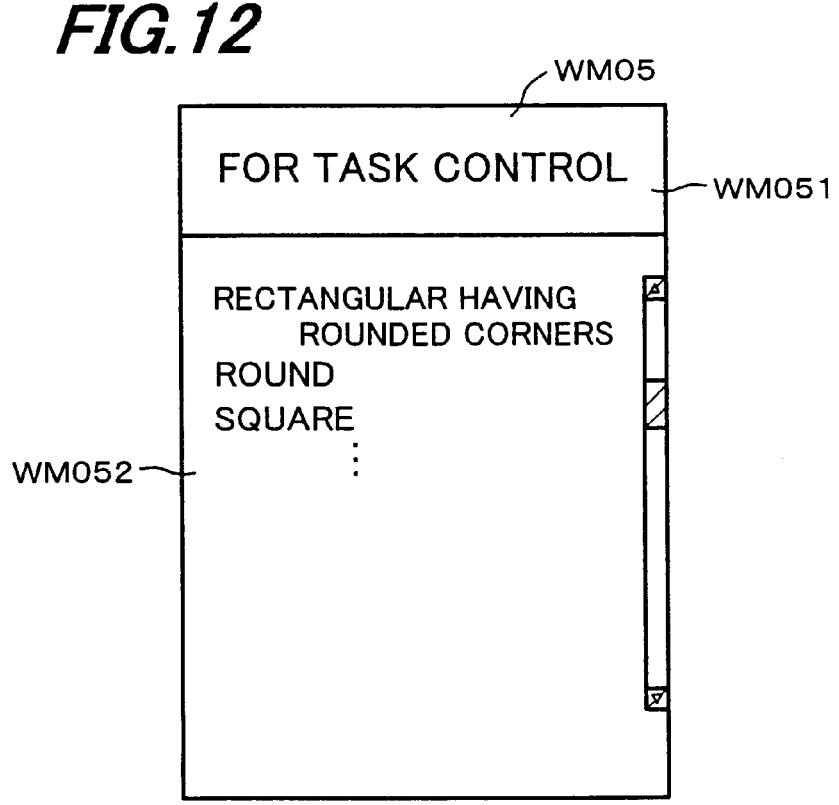
FIG. 12 is a view of a selection menu for selecting a button for task control use.

Here, as shown in FIG. 12, the selection menu WM05 is made up of a menu title display frame (window) WM051 and a selection menu display frame (window) WM052 displaying a menu so that one button shape (for example a rounded rectangular shape) can be selected from among various button shapes.

When the operator has specified a window and selected a bit map, the design self-alteration control means (the control part 30 and the display control circuit 41) automatically self-alter the design of the window shown in FIG. 13A specified with the window specifying means (55) to the same design (a rounded rectangular) as the design (a rounded rectangular) of the bitmap selected with the bit map selecting means (55) (ST18) After this alteration, the window design alteration ends (ST19: YES).

Figure 3:
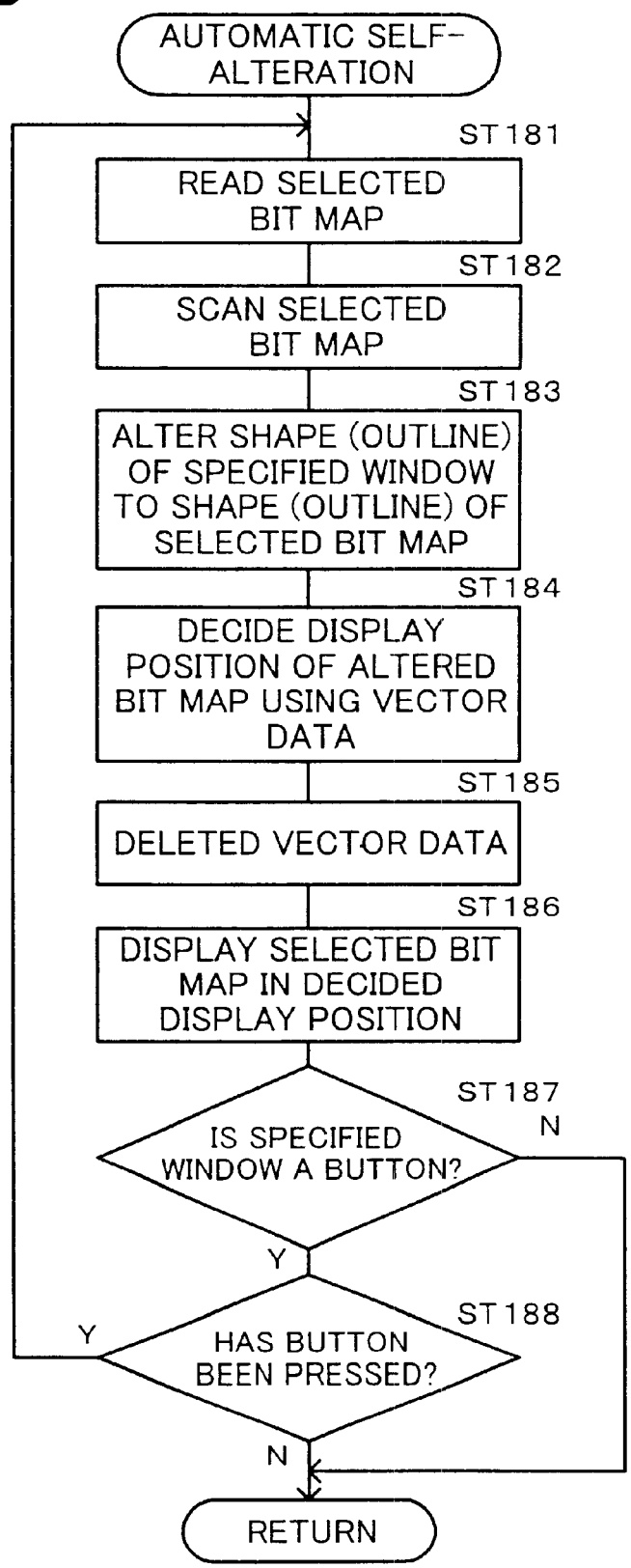
FIG. 3 is a flow chart illustrating a specified window automatic self-alteration operation of the invention.

FIG. 3 is a flow chart of an example of this automatic self-alteration.

In FIG. 3, the control part 30 reads in the selected bit map (the button WB031) with the design shown in FIG. 13B (a rounded rectangular) in accordance with a self-alteration program which in this preferred embodiment is held in the program files 35 PRG (ST181 of FIG. 3). This bit map WBO31 is raster data and is stored provided with relative position information by a relationship with vector data (B31) in the memory (35 BMP).

That is, at the time of selection, the bit map WB031 is displayed on the screen 60G (in this preferred embodiment, in a thumbnail format) with the outline (a rounded rectangular) and the color (for example the 'silver' often used as the color of buttons and the like) belonging to that design.

At the same time, a region B31 shown in FIG. 13B between an outline based on vector data (a rectangle) and the outline of the bit map (a rounded rectangular) is displayed in a color different from the display color of the bit map (for example 'pink', which is rarely used). For convenience, the 'pink' part (the region B31) is shown with hatching in FIG. 13B.

The outline based on vector data (a rectangle) is made so as to be the same as the outline of the specified window (a rectangle). Also, the upper left corner C of the region B31 accompanying the specified window (the button WB031) in FIG. 13B is positionally aligned with the upper left corner C of the specified window (the button WB03) of FIG. 13A in the design alteration.

That is, the original window WB03 shown in FIG. 13A and the pink region B31 in FIG. 13B are made the same shape (the same outline). Therefore, before the alteration the operator can infer the altered display position of the button WB031 in relation to the display position of the original specified button WB03.

Here, when the operator has specified a window and selected a bit map, the control part 30 scans the selected bit map (WB031) in a horizontal scanning direction and a vertical scanning direction (ST182 in FIG. 3). Then, in accordance with the scanning results (the outline of the bit map), the control part 30 automatically self-alters the outline pertaining to the design of the specified window WB03 (ST183).

The display position on the screen 60G of the specified window (the bit map WB031) after this design alteration is determined in relation to the outline (a rectangle) of the specified window WB03 as of before the automatic self-alteration, using the relative position information provided by the vector data B31 (ST184).

Figure 13C:
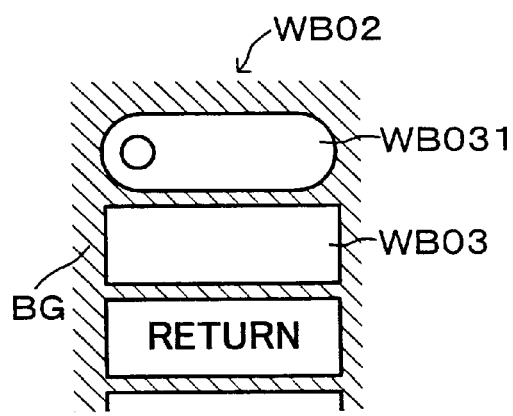
Figure 14:
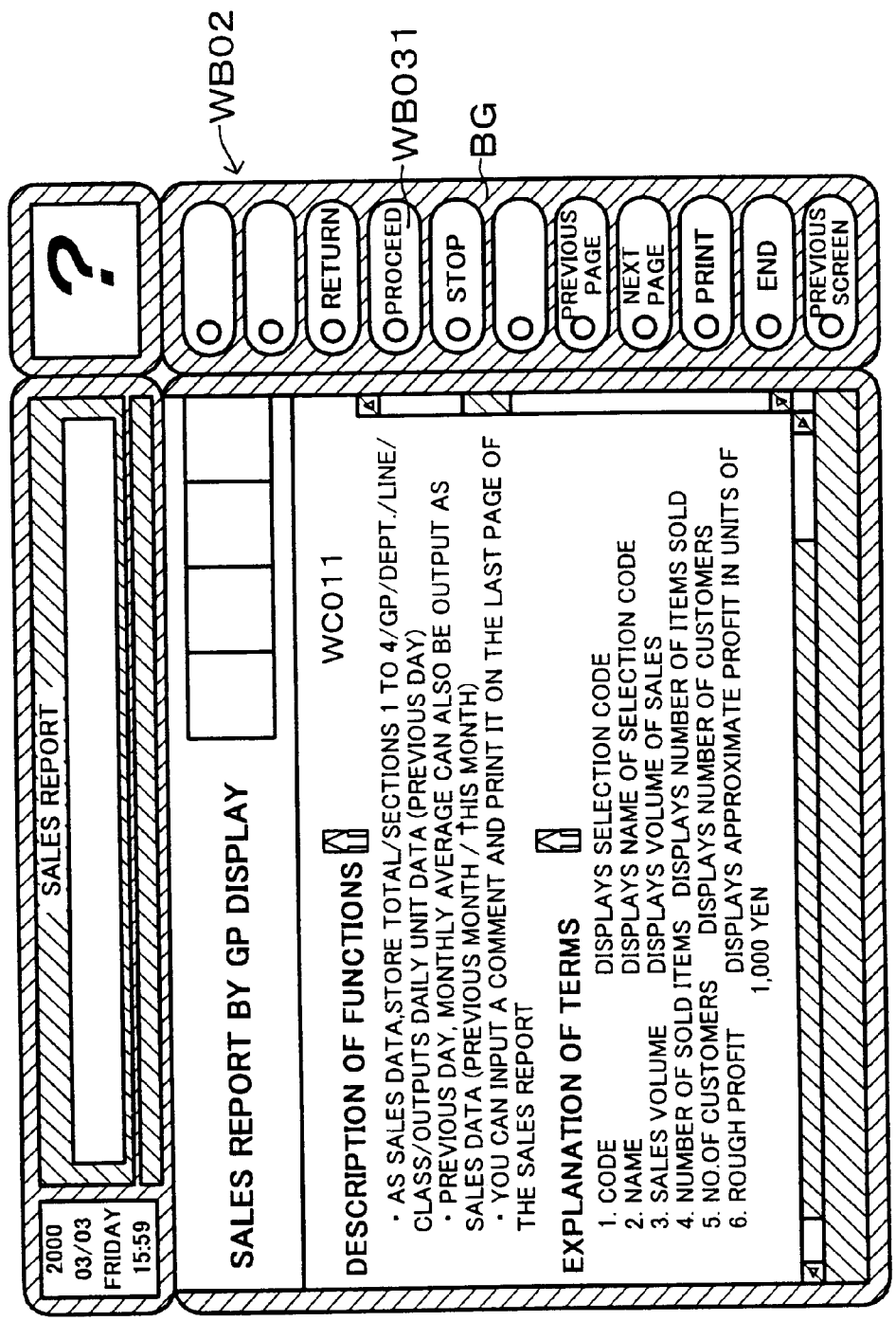
FIG. 14 is a view illustrating a set of buttons after the design alteration has been made to them.

After the design alteration of the specified window WB03, the pink region B31 displayed with hatching in FIG. 13B is removed because it is not bit map (ST185). And, as shown in FIG. 13C and FIG. 14, the pink region B31 is not displayed (ST186) on the screen 60G. BG in FIGS. 13A and 13C denotes a background color, which is the ground color of the screen 60G.

This automatic self-alteration is executed with the utility function of the specified window WB03 (an on/off-signal generating function) being effective within the outline pertaining to the design after the automatic self-alteration (a rounded rectangular) that is, within the bit map WB031. The region B31 shown in FIG. 13B assumes the background color BG shown in FIG. 13C and does not have the utility function (the on/off-signal generating function).

The altered window display control means (the control part 30 and the display control circuit 41) display the window on which the automatic self-alteration is executed (the button WB031) in the position on the screen 60G shown in FIG. 13C determined in relation to the window (the button WB03) before the automatic self-alteration (ST186). BG is the background color (for example green). Thus, the altered window display control means (30, 41) can alter the design of the original windows WB03 shown in FIG. 5 and FIG. 13A to rounded rectangular buttons WB031 as shown in FIG. 14.

When the specified window is a button (ST187: YES), the automatic design self-altering function alters the button design of the specified window (WB03) to two designs (ON-state: bold, OFF-state: withdrawn) corresponding to buttons of two selected bit maps (WB031×2). Also, when a displayed button has been operated (ST188: YES), the design of the specified window can be automatically self-altered (ST183) so that a formerly undisplayed button is displayed and the formerly displayed button is switched to an undisplayed state.

Automatic self-alteration en bloc of the design of a number of buttons (WB03) of the same design as the design of a specified window (WB041) is also possible. For example, when with respect to one specified window (WB041) shown in FIG. 5 and FIG. 13A the bit map WB031 of a design (a rounded rectangular) indicating one type of button (WB031) is selected, the design self-altering function automatically self-alters en bloc the design of all the buttons (WB03) of the specified window (WB041) to the design of the selected bit map (WB031). The alteration efficiency of this design self-alteration function is high. After the design alteration, it is displayed as a line of a plurality of rounded rectangular buttons W031, as shown in FIG. 14.

And, even when a bit map WB031 of a design (a rounded rectangular) indicating one type of button (WB031) is selected with respect to a plurality of specified windows (for example, WBO41 through WB045 shown in FIG. 15) displayed overlapping on the screen 60G and with their designs displaying the same button (WB03), the design self-alteration function can automatically self-alter en bloc the designs of the buttons (WB03) of the specified windows (WB041 through WB045) to the design of the button of the selected bit map (WB031) in the same way as in the case described above. The alteration efficiency of this design self-alteration function is also high. After the design alteration, the windows are displayed as a line of a plurality of rounded rectangular buttons W031, as shown in FIG. 14.

Figure 15:
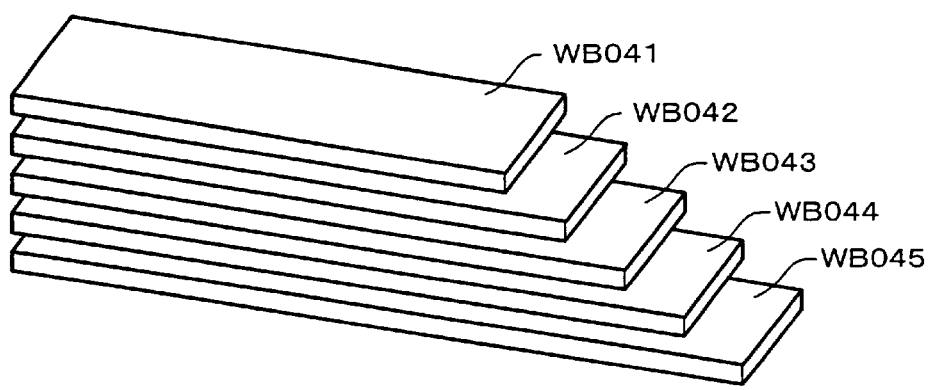
FIG. 15 is a view illustrating a number of specified windows (buttons) which can be displayed overlapping.
Figure 18A:
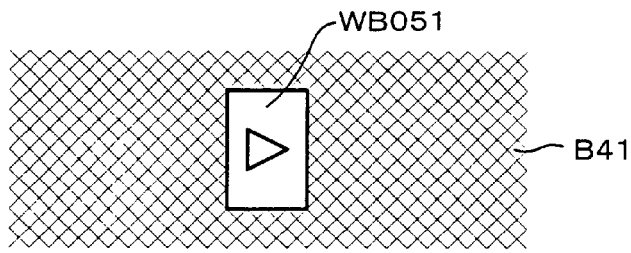
FIGS. 18A through 18F are views illustrating a first example of a combination button after the design alteration.
Figure 18B:
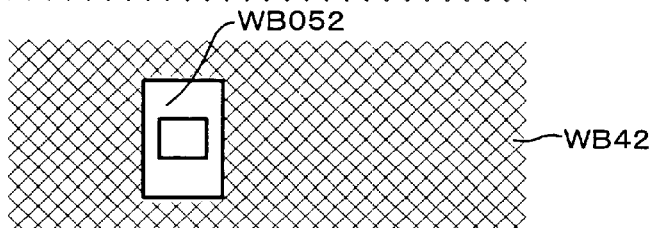
Figure 18C:
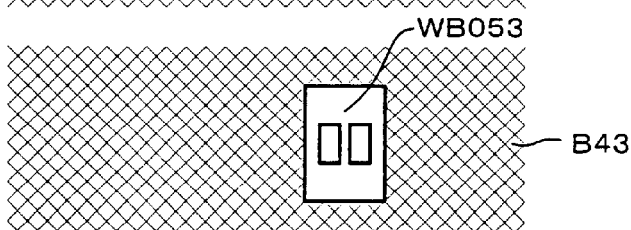
Figure 18D:
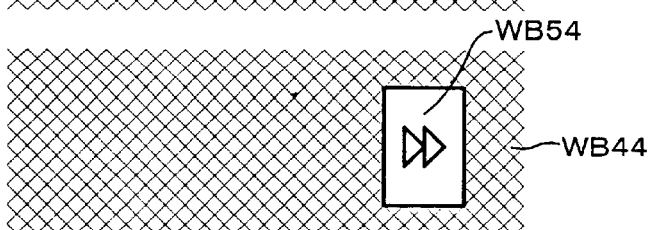
Figure 18E:
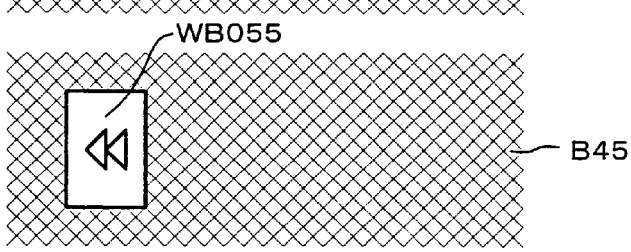
Figure 18F:
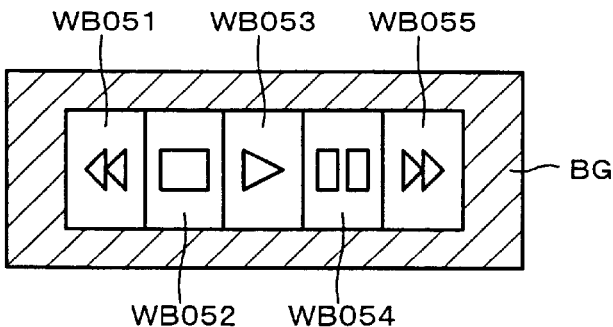

On the other hand, a plurality of windows WB041 through WB045 shown in FIG. 15 which are displayed overlapping on the screen 60G and the utility function of each of which is the button function (the on/off-signal generating function) may be specified, and in correspondence with the specified windows WB041 through WB045 bit maps (play WB051 through rewind WB055) of designs (with pink regions B41 through B45 displayed as hatching) indicating respective buttons shown in FIGS. 18A through 18E may be selected. In this case, the bit maps (WB051 through WB055) after the automatic self-alteration of the specified windows WB041 through WB045 are displayed together without overlapping one another. That is, as shown in FIG. 18F they can be displayed as a planar combination button made up of the buttons (WB051 through WB055) disposed contiguously in a straight line. BG in FIG. 18F denotes a image background color (for example blue).

In this case also, because the pink regions B41 through B45 do not have button functions and assume the background color (blue), there is no display of pink color.

Figure 16:
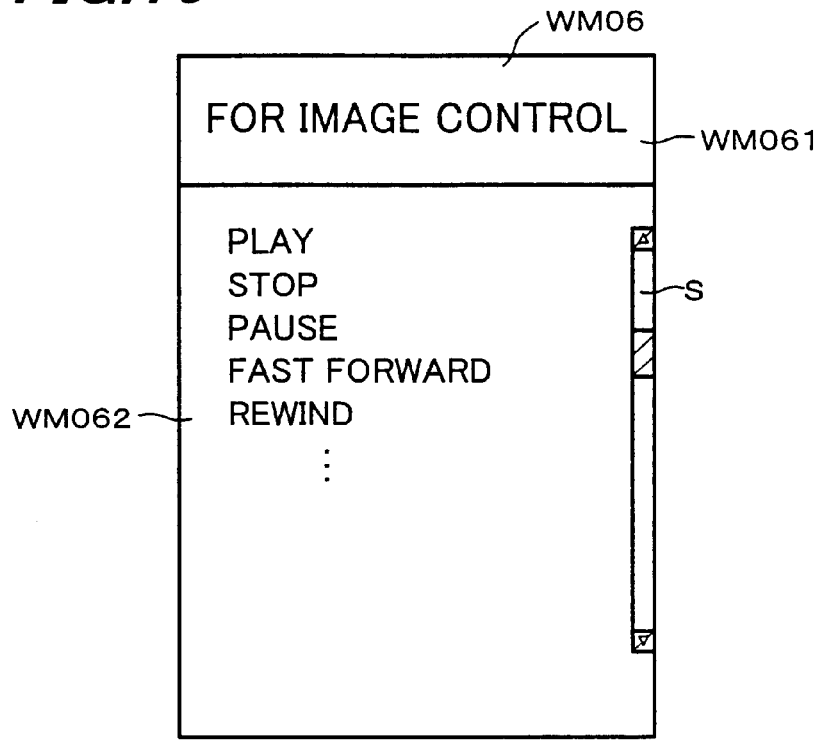
FIG. 16 is a view of a selection menu for selecting a button for image control use.
Figure 17:
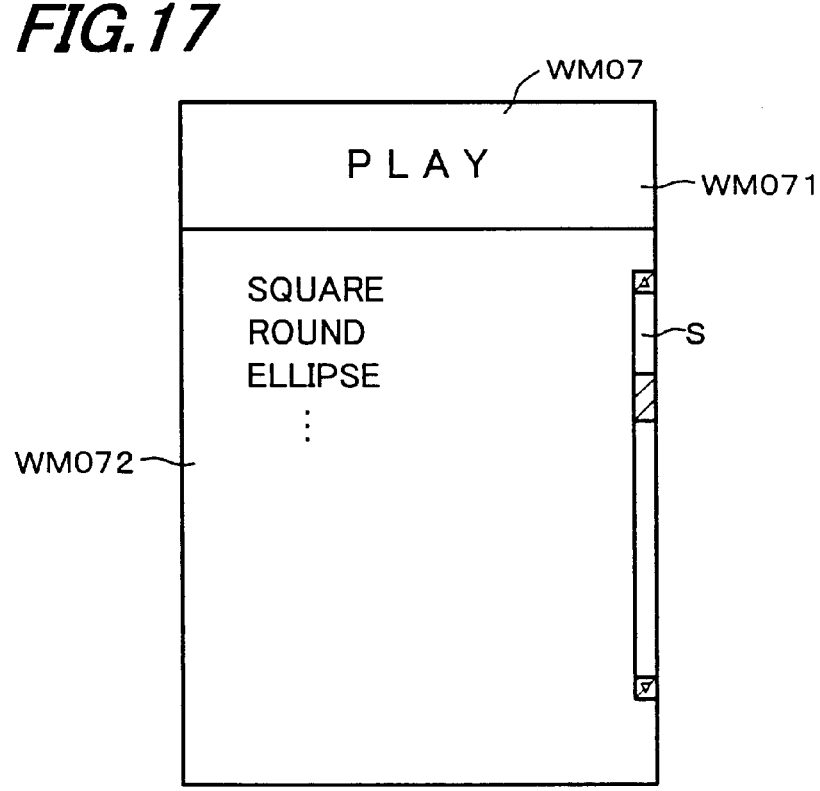
FIG. 17 is a view of a selection menu for selecting a playback button.

To do this, using a selection menu WM06 (title WM061, button names WM062) displayed on the screen 60G, shown in FIG. 16, the operator for example selects 'play' and then uses a selection menu WM07 (title WM071, button shapes WM072) shown in FIG. 17 to select for example 'rectangle' as the design for the button 'play'.

By the same method, when bit maps of designs indicating buttons (play WB061 through rewind WB065, with pink regions B41 through B45) shown in FIGS. 19A through 19E are each selected, by displaying together the automatically self-altered bit maps of the specified windows WB041 through WB045 of FIG. 15 without overlapping one another, it is possible to display a planar combination button made up of the buttons (WB061 through WB065) disposed contiguously in the shape of an ellipse, as shown in FIG. 19F.

Thus, this system can automatically self-alter the design of standard windows (for example WB02) of the standard layout image WL01, shown in FIG. 5, in which a plurality of types of standard window WA01, WF01, WB01 are displayed on the screen 60G, to the design of respective selected bit maps (WB031), one specified standard window at a time. And also, by altering the design of the standard windows while holding the standard layout image WL01, the system can alter the design the whole layout image, for example as shown in FIG. 14.

So far, a case where the standard layout image WL01 shown in FIG. 5 is kept fixed and the design of the layout image is altered and a case where the standard layout image WL01 is positively selected and the design of the image of the standard layout image WL01 is altered have been discussed; however, a standard layout image itself can also be made the object of a window design alteration and have its design altered.

Design alteration of a standard layout image itself will now be described.

Figure 7:
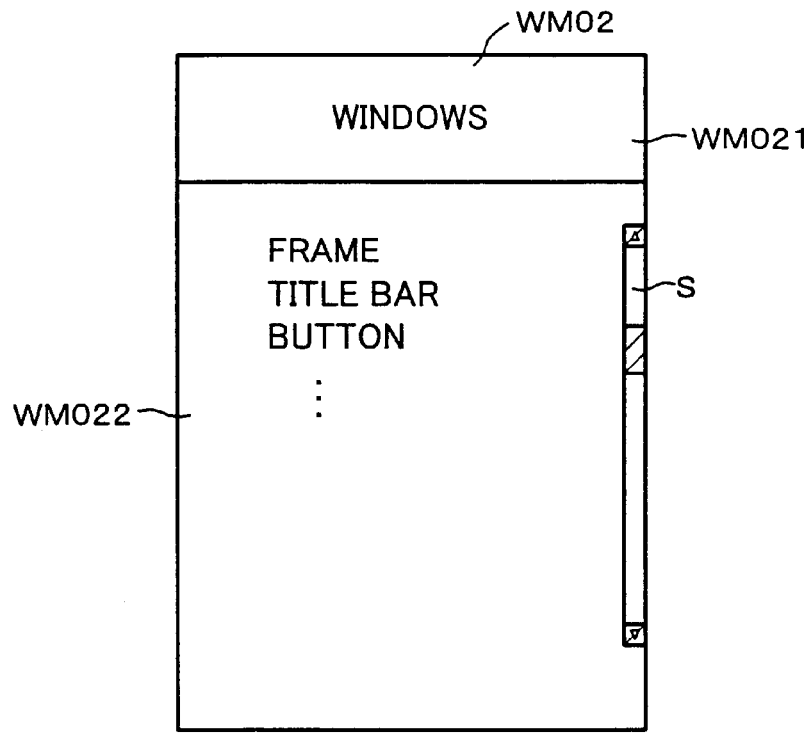
FIG. 7 is a view of a selection menu for selecting a window.
Figure 8:
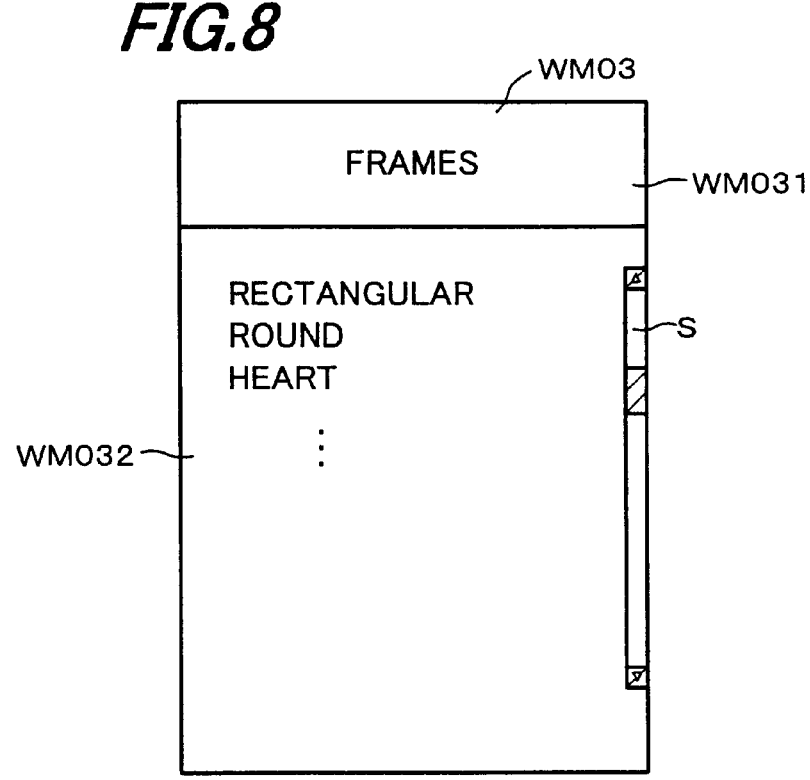
FIG. 8 is a view of a selection menu for selecting a frame.

For example if the operator uses a selection menu WM02 (title WM021, window names WM022) shown in FIG. 7 to select 'frame' and then uses a selection menu WM03 (title WM031, frame shapes WM032) shown in FIG. 8 to select 'round', the design self-alteration function alters the design of the original rectangular frame (window) to the round window (WF02) shown in FIG. 9.

Consequently, because the window after the design alteration is displayed as if fish displayed on the screen 60G are being viewed through a round viewing window of a sight-seeing boat (the window WF02), a good sense of presence is obtained. In FIG. 9, BCL denotes a button for closing the window and BBS denotes a button for restoring the window to the preset standard layout image (for example FIG. 5).

Similarly, by selecting 'frame' on the selection menu of FIG. 7 and then selecting the frame 'heart' shown in FIG. 8, the operator can alter the design to a heart-shaped frame, as shown in FIG. 10 (window WF03). Accordingly, this system can easily accommodate also the desire to write a message (for example "How are you doing? Today . . . ") inside a window in the shape of a heart and send electronic mail to a special person.

In this preferred embodiment, the operator specifies (ST13 in FIG. 2: YES) a window (for example a rectangular frame having a data display function or a button having an on/off-signal generating function) to be the object of the design alteration from among windows displayed on the screen 60G of the personal computer 20 (the operator's display 60). And the operator selects a bit map to become the design of the specified window from among bit maps stored in a memory (ST17: YES).

When the operator has specified a window and selected a bit map, a design self-alteration function with which the specified window (itself) is provided works and automatically self-alters its own design [shape (outline), color, etc.] to the same design [shape (outline), color, etc.] as the design [shape (outline), color, etc.] of the selected bit map (ST18).

In this automatic self-alteration, any utility function which the specified window had (for example a data display function or an on/off-signal generating function) is effective within the scope of the outline (bit map) pertaining to the design after the automatic self-alteration (ST183 in FIG. 3). Anything outside the outline (for example the pink region B31 in FIG. 13B) does not have this utility function and becomes mere background image.

The specified window may be either reduced or enlarged to the size of the selected bit map. In the case of reduction, the operator need not consider the original layout image on the screen 60G; however, in the case of enlargement, the operator should consider the layout of the window on the original image before selecting a design. This is because the altered window may overlap with other parts of the original image.

Thus, with this system it is possible to alter simply and in various ways the design (shape, outline, color, image texture, etc.) of windows (frames, buttons, etc.) while maintaining their utility functions, even when the basic layout image on the screen 60G (see for example FIG. 5) is the same. As a result, the system can make a substantial contribution to the further spread of computers using GUIs.

That is, for example in retail business machines (10) this system can adapt to regional circumstances and competitors etc., and also to different staff groups or different average levels of store staff and their subjective preferences. Also, the system can substantially simplify operation of a computer (10). Furthermore, the utility function of a window before the design alteration effectively functions only within the scope of the outline of the window after the design alteration. Consequently, for example problems such as touching an adjacent button when pressing an altered button can be avoided.

Also, it becomes unnecessary for creators to make programs and image data and so on with windows of various designs as fixedly individual and integrated finished products. As a result, creators can achieve large cost reductions in terms of both personnel and time. And because users can perform design alterations swiftly and easily without being design alteration specialists, they can improve their working efficiency. Also, if this system is used, as is appropriate in a diversified, individualistic and discriminating society, it is possible to satisfy personal tastes and preferences relating to the shapes and outlines of windows.

The bit maps, which are raster data, are stored provided with relative position information by a relationship with vector data (the pink region B31) shown in FIG. 13B in memory (the bit map files 35 BMP). The design self-alteration function automatically self-alters the specified window to the design of the selected bit map with its vector data. The position in which the specified window (selected bit map) is displayed on the screen 60G after the design alteration is determined in relation to the outline of the specified window before the automatic self-alteration using the relative position information provided by the vector data.

Consequently, the operator can easily distinguish the display position of the specified window (bit map), of which design has been altered, with respect to the display position of the specified window before the design alteration. That is, whether in the case of a design reduction, when the outline of the selected bit map (shape, plan size) is smaller than the outline of the specified window (shape, plan size), or in the opposite case of a design enlargement, this system makes window design alterations which match the overall layout image easy.

And, the selected bit map is displayed on the screen 60G with the outline and colors pertaining to the design. And the region (the pink region B31) shown in FIG. 13B between the outline based on vector data and the outline of the bit map is displayed with a color (such as 'pink', which is rarely used) different from the display color of the bit map (often 'silver' in the case of buttons and the like). After the design alteration of the specified window, because the pink region (B31) of FIG. 13B is not bit map, it is not displayed on the screen 60G.

In other words, the operator can ascertain clearly and exactly a guide to the display position of the outline (shape, plan size) of the specified window (bit map) after the design alteration with respect to the outline (shape, plan size) of the specified window before the design alteration. Thus the operator can distinguish still more easily the display position of the specified window (bit map) after the design alteration with respect to the display position of the specified window before the design alteration, and the handling of windows in connection with design alterations becomes much easier for the operator.

The outline of a rectangular specified window (WB03 in FIGS. 13A and 13C) is the same as the outline based on the vector data (B31) corresponding to the selected bit map (WB031). The outline (shape) of the bit map inside the outline based on the vector data may be an outline other than the outline (shape) based on the vector data (for example a round-cornered rectangle or a circle, etc.).

That is, this system allows design alterations to be made with the selected bit map displayed in a predetermined position on the screen 60G with the outline based on the vector data accompanying the selected bit map aligned with the outline of the specified window. Accordingly, this system can for example perform design alterations (for example WB03→WB031) of buttons (windows) more easily while maintaining the layout of the overall image.

The design self-alteration function scans the selected bit map in a horizontal scanning direction and a vertical scanning direction (ST182 in FIG. 3). Then, in accordance with the scanning results (the outline of the bit map), the outline pertaining to the design of the specified window is automatically self-altered. In the case of a bit map with accompanying vector data, a design alteration of the specified window is made which includes position information with respect to the outline based on the vector data (B31) of the bit map (WB031). Consequently, this system can be applied whatever the shape of the bit map. Also, the system can maintain the display clarity of the bit map outline after the design alteration.

And, the operator may specify a plurality of windows (WB041 through WB045 in FIG. 15) having button functions which can be displayed overlapping on the screen 60G. And, the operator may select bit maps (WB051 through WB055 in FIGS. 18A through 18E) of designs indicating buttons corresponding to the specified windows. Then, the specified windows automatically self-alter (change) to the respective selected bit maps. By the bit maps (windows) after the automatic self-alteration of the specified windows being displayed together without overlapping one another as a planar combination button (FIG. 18F, FIG. 19F). Thus with this system it is possible to alter for example buttons for image control use (play, stop, pause, fast forward, . . . ) to a unique design in which they are combined in the shape of a rectangular or an ellipse.

And, the operator may specify one window (the navigation strip WB02) able to display a plurality of buttons having the same design and then select one bit map (WB031) of a design indicating a button. Then, the design self-alteration function automatically self-alters en bloc the design of each of the buttons of the specified window to the design of the button of the selected bit map. The alterations may alternatively be executed in succession. Thus it is possible to alter the design of the buttons in a window simply and swiftly.

And, an operator may specify a plurality of windows displayed overlapping on the screen 60G and capable of displaying a plurality of buttons having the same design and select one bit map of a design indicating a button. Then, the design self-alteration function automatically self-alters en bloc the design of the buttons of the specified windows to the design of the button of the selected bit map. The alterations may alternatively be executed in succession. Thus it is possible with this system to alter the design of the buttons in a number of windows simply and swiftly.

And, the operator may specify one window (button) and select two button (window) bit maps having different designs. Then, the design self-alteration function alters the design of the specified window to two designs corresponding to the buttons of the two selected bit maps. After the alteration, when a button being displayed is operated, a button which had until then not been displayed is displayed. Also, the button which had until then been displayed switches to non-display state. In other words, the buttons are oppositely switched between ON and OFF. However, for order of alteration, the button altered first is operated to make its on/off-signal generating function work. Then, the design of the remaining button is altered. This is because they must be displayed alternately in the same plan position. Thus, with this system it is possible to alter a button having an on/off-signal generating function to a design with a sense of presence.

Also, the operator may start the system on executing for example a card processing task or a game. When this happens, for example the standard layout image WL01 shown in FIG. 5 is displayed on the screen 60G. In this standard layout image WL01, a plurality of types of standard window (frames, buttons, etc.) are displayed. The operator specifies a desired standard window and selects a bit map for this specified window. Then, the specified standard window automatically self-alters to the design of the selected bit map. Design alterations can be made in the same way for other specified standard windows as well. Accordingly, with this system it is possible while holding the standard layout image WL01 to alter the design of the overall layout image through design alterations to the standard windows WB01, WF01 and so on.

In other words, while keeping the standard layout image WL01 and guaranteeing its operability, by altering the design of individual windows it is possible to alter the design of the overall layout image. As a result, the utility of the system is high and it can cater to the tastes of any user.

Also, the operator may request the execution of goods sale data processing (goods registration, accounting, etc.). In this case, a standard layout image (WL01, WL02) including for example standard windows (buttons) for giving instructions for executing this processing and standard windows (data display regions) for displaying results of goods sale data processing is displayed on the screen 60G. As a result, the system can execute the task with high efficiency. Also, because with this system it is possible to make design alterations to standard windows for example corresponding to different levels of store staff, the applicability of the system is wide.

Also, by referring to a standard layout image selection menu image (WM01 of FIG. 4) displayed on the basis of a request for the execution of goods sale data processing, for example a right-handed operator can select the standard layout image WL01, which is for a right-handed operator, and conduct the data processing using this standard layout image. Thus, with this system it is possible to switch selectively even the highest-level windows (the standard layout images made up of standard windows). As a result, the system can promote the diversification of window designs and is highly convenient.

And with this system it is possible to select bit maps corresponding to specified windows using selection menus displayed on the screen 60G. As a result, the selection operation in the system is easier than when the operator makes selections by key input and soon.

Also, the selection menu display control means (30) displays selection menus on the screen 60G so that it is possible to select any bit map from among bit maps stored in a memory (35 BMP). And with the bitmap selecting means (55) it is possible to select a bit map with reference to a displayed selection menu. Thus the system is easy to deal with and the operation of selecting a bit map can be performed swiftly and exactly.

Also, bit maps can be stored in the memory (35 BMP) as data in other formats than bit map (for example JPEG-compressed data). This other format data is converted to bit map data before the design self-alteration control means (30) executes an automatic self-altering operation. Thus the system allows the memory (35 BMP) to be made small or many more different bit maps to be held.

Also, the screen is the screen 60G of an operator's display 60 for informing the operator of goods sale data processed in the goods sale data processing machine (electronic cash register 10). And the system can alter the design of windows on the screen 60G. Thus, the system makes it possible to execute goods sale data processing tasks with high efficiency. Also, because with this system it is possible to make design alterations to windows (frames, buttons, etc.) for example corresponding to different levels of store staff, the applicability of the system is wide.

What is claimed is:

1. A window design alteration method by computer processing that alters a design of a window displayed on a screen of a computer running under a graphical user interface environment, comprising:

automatically self-altering a design of at least one window which is specified as an object of a design alteration from among windows being displayed on the screen, wherein the automatically self-altering comprises a design self-alteration function configured to self-alter the design of the specified window to the same design as at least one bit map selected from among bit maps that have been stored in a memory, and the automatically self-altering is carried out such that a function included in the specified window is effective exclusively within an outline pertaining to a design after the automatic self-alteration.

2. The window design alteration method as defined in claim 1, wherein the bit maps, which is raster data, are stored in the memory with vector data that specifies relative position information of the bit maps, and wherein the design self-alteration function alters a design of the specified window to a design of the selected bit map so that the selected bit map is displayed in a predetermined position on the screen determined in relation to an outline of the specified window before the automatic self-alteration using the relative position information specified by the vector data.

3. The window design alteration method as defined in claim 2, wherein the selected bit map is displayed on the screen with an outline and color which pertain to a design of the selected bit map and a region between an outline based on the vector data and an outline of the bit map is displayed in a color different from a display color of the selected bit map.

4. The window design alteration method as defined in claim 2, wherein an outline based on the vector data is the same as an outline of the specified window.

5. The window design alteration method as defined in claim 1, wherein the design self-alteration function scans the selected bit map and automatically self-alters an outline pertaining to a design of the specified window in accordance with a result of the scanning.

6. The window design alteration method as defined in claim 1, wherein when one type of bit map of a design indicating a button is selected with respect to one specified window displaying a plurality of buttons having the same design, the design self-alteration function automatically self-alters designs of the buttons of the specified window to a design of a button of the selected bit map at one time.

7. The window design alteration method as defined in claim 1, wherein when one type of bit map of a design indicating a button is selected with respect to a plurality of specified windows displayed on the screen overlapping and displaying buttons having the same design, the design self-alteration function automatically self-alters the designs of the buttons of the specified windows to a design of a button of the selected bit map at one time.

8. The window design alteration method as defined in claim 1,
wherein a design of each of standard windows in a standard layout image in which a plurality of types of the standard windows are displayed on the screen is automatically self-altered to a design of selected bit map for each of the specified standard windows, and an overall image design of the screen is changed by altering a design of each of the standard windows while maintaining the standard layout image.

9. The window design alteration method as defined in claim 8,
wherein each of the standard windows displayed on the screen is a window for giving an instruction for performing goods sale data processing and displaying a result of the processing.

10. The window design alteration method as defined in claim 8,
wherein the memory stores a plurality of the standard layout images, and an arbitrary standard layout image selected from among the plurality of the standard layout images is displayed on the screen.

11. The window design alteration method as defined in claim 1,
wherein the selected bit map has been selected using a selection menu displayed on the screen.

12. A window design alteration system capable of altering by computer processing a design of a window displayed on a screen of a computer running under a graphical user interface environment, comprising:
window display control means for displaying at least one window having a function on the screen;
window specifying means for specifying at least one of the windows to be the an object of a design alteration from among the windows displayed on the screen;
a memory storing a plurality of bit maps;
bit map selecting means for selecting at least one of the bit maps from among the bit maps stored in the memory;
design self-alteration control means for automatically self-altering a design of the specified window specified by the window specifying means to the same design as the selected bit map selected by the bit map selecting means and for executing the automatic self-alteration, such that a function included in the specified window is effective exclusively within an outline pertaining to a design after the automatic self-alteration; and
altered window display control means for displaying the specified window, on which the automatic self-alteration has been executed, in a position on the screen determined in relation to a position of the specified window before the automatic self-alteration.

13. The window design alteration system as defined in claim 12, further comprising selection menu display control means for displaying a selection menu on the screen so that an arbitrary bit map is selected from among the bit maps stored in the memory,
wherein the bit map selecting means executes selection with reference to the displayed selection menu.

14. The window design alteration system as defined in claim 12,
wherein bit maps stored in the memory is stored in the memory as another format data of a format other than bit map format and the other format data is converted to the bit map format before the automatic self-alteration control means executes an automatic self-alteration operation.

15. The window design alteration system as defined in claim 12,
wherein the screen is a screen for an operator's display for informing the operator of goods sale data to be processed by a goods sale data processing machine.

16. A window design alteration system capable of altering by computer processing a design of a window displayed on a screen of a computer running under a graphical user interface environment, comprising:
window display control means for displaying a plurality of windows displayed overlapping on the screen, wherein a function of each comprises a button function;
window specifying means for specifying a plurality of windows to be objects of design alteration from among the windows displayed overlapping on the screen;
a memory storing a plurality of bit maps;
bit map selecting means for selecting a plurality of bit maps corresponding to the respective specified windows from among the bit maps stored in the memory;
design self-alteration control means for automatically self-altering designs of the specified windows specified by the window specifying means to the same designs as the respective selected bit maps selected by the bit map selecting means and for executing the automatic self-alteration, such that a function included in each of the specified windows is effective exclusively within an outline pertaining to a design after the automatic self-alteration; and
altered window display control means for displaying together the selected bit maps, on which the automatic self-alteration has been executed, without overlapping one another, so as to display a plurality of buttons combined on the same plane.

17. The window design alteration system as defined in claim 16, further comprising selection menu display control means for displaying a selection menu on the screen so that an arbitrary bit map is selected from among the bit maps stored in the memory,
wherein the bit map selecting means executes selection with reference to the displayed selection menu.

18. The window design alteration system as defined in claim 16,
wherein bit maps stored in the memory is stored in the memory as another format data of a format other than bit map format and the other format data is converted to the bit map format before the automatic self-alteration control means executes an automatic self-alteration operation.

19. The window design alteration system as defined in claim 16,
wherein the screen is a screen for an operator's display for informing the operator of goods sale data to be processed by a goods sale data processing machine.

20. A window design alteration method by computer processing that alters a design of a window displayed on a screen of a computer running under a graphical user interface environment, comprising:

automatically self-altering a design of at least one window which is specified as an object of a design alteration from among windows being displayed on the screen, wherein the automatically self-altering comprises a design self-alteration function configured to self-alter the design of the specified window to the same design as at least one bit map selected from among bit maps that have been stored in a memory, the automatically self-altering is carried out such that a function included in the specified window is effective within an outline pertaining to a design after the automatic self-alteration, and wherein, when a plurality of windows displayed overlapping on the screen and each of which the function is a button function are specified and bit maps of designs indicating buttons for the respective specified windows are selected, the selected bit maps after the automatic self-alteration of the specified windows are displayed together without overlapping one another so as to be displayed as a plurality of buttons combined on the same plane.

21. The window design alteration method as defined in claim 20, wherein designs of the specified windows are automatically self-altered so that a design of each of the specified windows is altered to two designs corresponding to buttons of two selected bit maps, and when one of the buttons which is being displayed is operated, another of the buttons which has not been displayed until then is displayed and the one of the buttons which has been displayed until then is to be switchable to non-display state.

* * * * *